United States Patent
King et al.

(10) Patent No.: US 10,053,204 B2
(45) Date of Patent: Aug. 21, 2018

(54) ADJUSTABLE SUPPORT STRUCTURE FOR AIRCRAFT CABIN CEILING

(71) Applicant: The Boeing Company, Chicago, IL (US)

(72) Inventors: Timothy Todd King, Freeland, WA (US); Kenneth G. Davis, Brier, WA (US); Matthew R. Thomas, Marysville, WA (US); Mark J. Nadvornick, Lynnwood, WA (US); James R. McCune, Stanwood, WA (US); Jason W. Mullins, Edmonds, WA (US)

(73) Assignee: The Boeing Company, Chicago, IL (US)

( * ) Notice: Subject to any disclaimer, the term of this patent is extended or adjusted under 35 U.S.C. 154(b) by 349 days.

(21) Appl. No.: 14/840,245

(22) Filed: Aug. 31, 2015

(65) Prior Publication Data
US 2017/0057613 A1 Mar. 2, 2017

(51) Int. Cl.
*B64C 1/06* (2006.01)
*B64D 11/00* (2006.01)

(52) U.S. Cl.
CPC .............. *B64C 1/066* (2013.01); *B64D 11/00* (2013.01)

(58) Field of Classification Search
CPC ......... B64C 1/066; B64C 1/069; B64C 1/403; B64C 1/406; B64D 2011/0046; Y10T 403/142; Y10T 403/145; Y10T 403/7094; Y10T 403/32221; E04B 2001/0963; F16C 11/045
USPC ....................................................... 244/131
See application file for complete search history.

(56) References Cited

U.S. PATENT DOCUMENTS

| 4,490,883 | A | * | 1/1985 | Gauron | B64C 1/066 16/245 |
|---|---|---|---|---|---|
| 4,799,631 | A | | 1/1989 | Humphries et al. | |
| 6,199,798 | B1 | | 3/2001 | Stephan et al. | |
| 6,536,710 | B1 | | 3/2003 | Bobzien et al. | |
| 7,883,057 | B2 | | 2/2011 | Lewis | |
| 8,656,677 | B2 | | 2/2014 | Kernmayer et al. | |
| 2011/0024565 | A1 | | 2/2011 | Koefinger et al. | |

(Continued)

FOREIGN PATENT DOCUMENTS

GB 2169256 7/1986

OTHER PUBLICATIONS

Pilgren, Rachel, AC Cables: The Connection Between Latching and Remote Actuation (http://blog.southco.com/ac-cables-connection-latching-remote-actuation-2/), printed from the World Wide Web on Aug. 27, 2015.

(Continued)

*Primary Examiner* — Jessica B Wong
(74) *Attorney, Agent, or Firm* — McDonnell Boehnen Hulbert & Berghoff LLP

(57) ABSTRACT

A system for adjusting a height of a ceiling panel in an aircraft and a corresponding method is disclosed. The system includes an arm and at least one ceiling support latch, wherein each of the at least one ceiling support latches is attached to the arm. The system further includes an adjustable fitting attached to the arm, wherein the adjustable fitting includes (i) a first sliding block attached to the arm, (ii) a second sliding block attached to a support structure, and (iii) an adjustment screw. Adjustment of the adjustment screw forces the first and second sliding blocks to move relative to one another.

20 Claims, 18 Drawing Sheets

(56) References Cited

U.S. PATENT DOCUMENTS

2011/0133027 A1    6/2011  Graeber et al.
2012/0145828 A1    6/2012  Grosse-Plankermann et al.

OTHER PUBLICATIONS

Extended European Search Report prepared by the European Patent Office in application No. EP 16186242.0 dated Mar. 13, 2017.

* cited by examiner

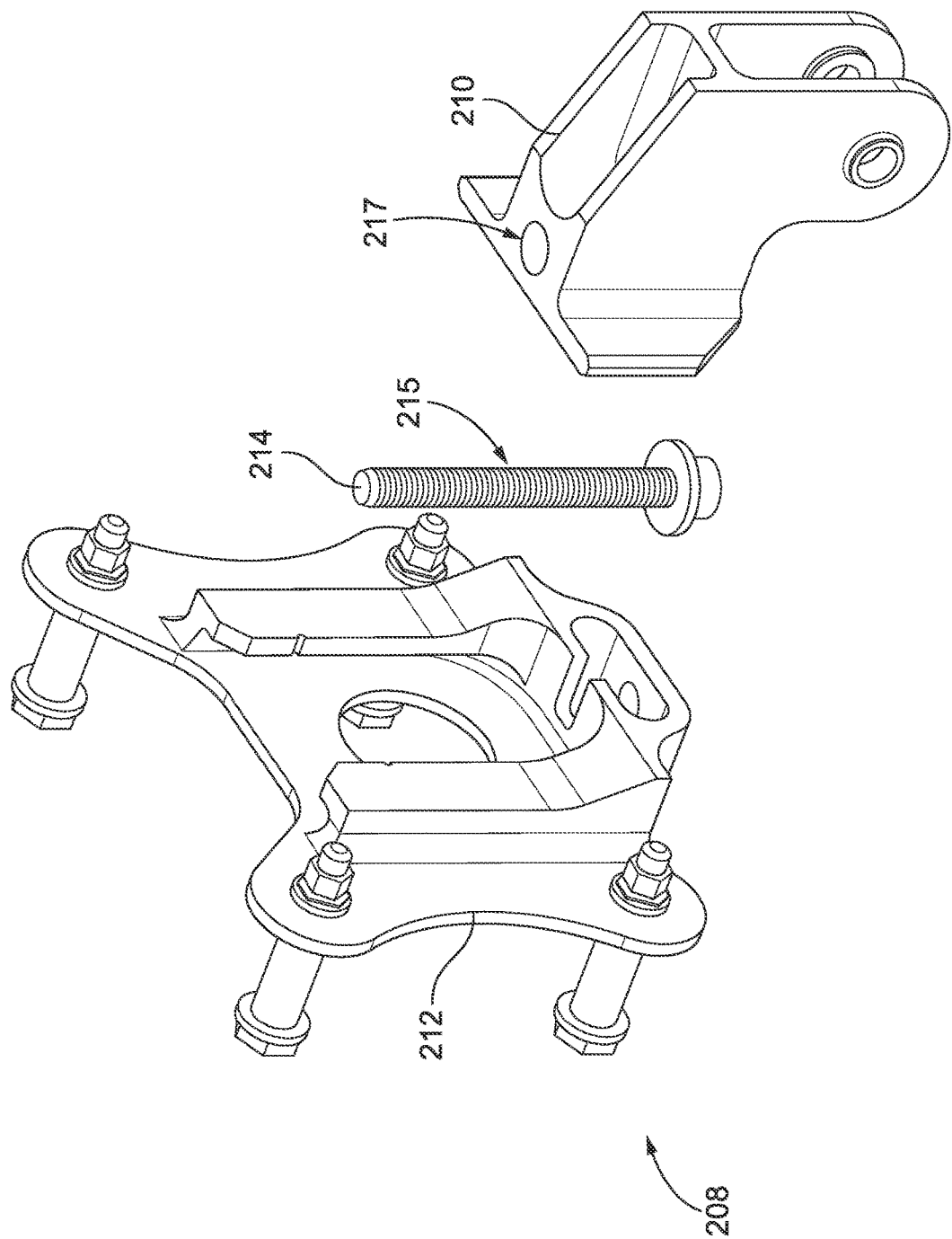

ADJUSTABLE SUPPORT STRUCTURE FOR AIRCRAFT CABIN CEILING

FIELD

The present disclosure relates to a crown portion of an aircraft. More specifically, the present disclosure relates to support systems and methods for a crown portion of an aircraft.

BACKGROUND

Unless otherwise indicated herein, the materials described in this section are not prior art to the claims and are not admitted to be prior art by inclusion in this section.

An aircraft typically includes a plurality of aircraft equipment inside an upper fuselage segment of the aircraft, such as various systems, equipment, furnishings, and linings. These various systems, equipment, furnishings, and linings may include, for example, electrical equipment, wires, environmental control system (ECS) equipment and ducts, oxygen lines, water lines, power feeders, cabin ceiling panels, and other items. Typically, one or more secondary structures attached to the airframe provide support for these various systems, equipment, furnishings, and linings inside the upper fuselage segment. In an example, a secondary support structure is provided for the cabin ceiling, another secondary support structure is provided for electrical equipment, and yet another secondary support structure is provided for the ECS equipment and ducts.

As another example, an existing solution includes a secondary structure in the form of grid and trusses and joists suspended on large tie rods. This structure is dubbed "the lattice" and is situated above the aircraft cabin ceiling. The lattice provides support to the equipment, furnishings, and linings above the cabin ceiling.

Although the lattice allows for both stable and variable configurations, the lattice is expensive, heavy, and difficult to install. The installation of the lattice in the aircraft and the attachment of equipment, furnishings, and linings to the lattice are primarily performed inside the aircraft. This attachment and installation process inside the aircraft is both time consuming and difficult. For example, this attachment and installation process typically involves numerous installation personnel, which may lead to congestion inside the aircraft during the installation process. This process is also time-consuming, as the process requires numerous installation steps and adjustments.

Existing secondary structure or structures can provide support for stable configurations of primary structures as well as variable configurations of payloads and systems. However, although existing secondary structure or structures can provide for variable configurations, often variable structural provisions on existing secondary structures remain underutilized. This underutilization adds additional weight to the support structure and also results in additional costs. There is, therefore, a need for a more cost-effective support structure and a less labor intensive method of assembling and installing a support structure for a crown portion of an aircraft.

Further, many system installation supports utilized in existing secondary support structures are supports composed of conventional sheet metal construction. Smaller scale sheet metal brackets and support trays are easy to manufacture and assemble, and they also provide conductivity for electric grounding and bonding. However, larger scale sheet metal trays and panels often used in wide-body aircraft require progressively more stiffening elements to provide adequate rigidity. This increases both the cost and weight of support structures. Composite honeycomb panels are often used for larger support panels. However, composite structures require specialized hardware to interface with attached equipment. Further, many composites are not electrically conductive and they require additional provisions for grounding and bonding. There is, therefore, a need for an improved system installation support for use in a secondary support structure or structures for a crown of aircraft.

Another drawback of existing secondary structures is that the process of attaching cabin ceiling panels to existing secondary structures and aligning the ceiling panels is difficult and time consuming. This existing process typically involves numerous steps, including repetitive tightening and loosening of fasteners, screwing and unscrewing tie rods, setting and resetting serrated pads, and the use of shimming. The process also often involves repetitive installation, removal, and re-installation of panels in order to obtain proper alignment of all of the panels. Thus, the existing process for attaching the ceiling panels to existing secondary structures is both time-consuming and costly. There is, therefore, a need for an improved system for attaching the ceiling panels to existing secondary structures and aligning the ceiling panels.

Yet another problem with existing secondary structures is adapting and adjusting to build tolerances that typically exist in airframes on an aircraft. Due to build tolerances from frame-to-frame, many existing structural attachments that attach directly to the airframe typically incorporate manual-adjustment features that compensate for build tolerances. For example, a secondary structure may be fastened to the airframe with tie rods, and these tie rods may be manually adjusted in order to accommodate for build variations in the airframe. These manual-adjustment features, however, introduce additional costs with not only additional parts but also additional labor. Further, these manual-adjustment features increase assembly time by adding additional steps to the assembly process. There is, therefore, a need for an improved system for attaching secondary structure to an airframe that accounts for build tolerances.

BRIEF SUMMARY

According to an exemplary arrangement, a support system for a crown area of an aircraft is presented. The support system includes a crown integration panel (CIP) comprising a honeycomb panel and sheet metal, wherein the CIP is configured to provide a mounting surface for a plurality of aircraft equipment and to provide an electrical ground for at least one of the aircraft equipment of the plurality of aircraft equipment. The support system further includes a first attachment and a second attachment attached to the CIP, wherein the first attachment and the second attachment are configured to attach to an airframe of the aircraft and to provide support for the CIP. Still further, the support system includes a crown raceway support (CRS) having a first end and a second end, wherein the first end of the CRS is attached to a first end of the CIP, and wherein the second end of the CRS is configured to attach to an outboard rail of the aircraft.

In another exemplary arrangement, a method for assembling support structures for an aircraft is provided. The method includes providing a plurality of support systems for a crown area of an aircraft, wherein each support system includes: (a) a CIP comprising a honeycomb panel and sheet metal, wherein the CIP is configured to provide a mounting surface for a plurality of aircraft equipment and to provide a ground for at least one of the aircraft equipment of the plurality of aircraft equipment; (b) a first attachment and a second attachment attached to the CIP, wherein the first attachment and the second attachment are configured to attach to an airframe of the aircraft and to provide support for the CIP; and (c) a crown raceway support (CRS) having a first end and a second end, wherein the first end of the CRS is attached to a first end of the CIP, and wherein the second end of the CRS is configured to attach to an outboard rail of the aircraft. The method further includes, prior to attaching the plurality of support systems to the airframe of the aircraft, (a) attaching, to each support system, the plurality of the aircraft equipment, and (b) assembling together the plurality of support systems.

According to an exemplary arrangement, a dual-bracketed support system is presented. The dual-bracketed support system includes (i) a first bracket connected to a support structure for a crown portion of an aircraft, (ii) a second bracket, and (iii) a support rod having a proximal end and a distal end, wherein the proximal end is connected to the first bracket and the distal end is connected to the second bracket. The second bracket is configured to allow the support rod to translate along a longitudinal axis defined by the support rod.

According to another exemplary arrangement, a dual-bracketed support system includes (i) a first bracket connected to a support structure for a crown portion of an aircraft, (ii) a second bracket connected to an outboard rail of the aircraft, and (iii) a support rod having a proximal end and a distal end, wherein the proximal end is connected to the first bracket and the distal end is connected to the second bracket. The second bracket is configured to allow the support rod to translate along a longitudinal axis defined by the support rod, and the second bracket is further configured to prevent rotations.

In another exemplary arrangement, a method for attaching one or more wires to a dual-bracketed support system is provided. The method includes providing a dual-bracketed support system. The dual-bracketed support system includes (i) a first bracket connected to a support structure for a crown portion of an aircraft, (ii) a second bracket, and (iii) a support rod having a proximal end and a distal end, wherein the proximal end is connected to the first bracket and the distal end is connected to the second bracket. The method further includes attaching a plurality of wires to the support rod, wherein during the attaching of the plurality of wires the support rod is arranged in a first position. Still further, the method includes, after attaching the plurality of wires, rotating the support rod from the first position to a second position.

According to an exemplary arrangement, a system for adjusting a height of a ceiling panel in an aircraft is presented. The system includes an arm and at least one ceiling support latch, wherein each of the at least one ceiling support latches is attached to the arm. The system further includes an adjustable fitting attached to the arm, wherein the adjustable fitting includes (i) a first sliding block attached to the arm, (ii) a second sliding block attached to a support structure, and (iii) an adjustment screw. Adjustment of the adjustment screw forces the first and second sliding blocks to move relative to one another.

In another exemplary arrangement, a method for installing ceiling panels for an aircraft is provided. The method includes, for each arm in a plurality of arms of a support system, attaching an adjustable fitting to the arm. The adjustable fitting includes (i) a first sliding block configured to attach to the arm, (ii) a second sliding block configured to attach to a support structure, and (iii) an adjustment screw, wherein adjustment of the adjustment screw forces the first and second sliding blocks to move relative to one another. The method further includes attaching each adjustable fitting to the support structure and adjusting each adjustable fitting, so that each arm is aligned with the other arms of the plurality of arms. The method also includes, for each arm in the plurality of arms, attaching at least one ceiling panel to the arm.

According to an exemplary arrangement, a self-aligning structural attachment for a CIP is presented. The self-aligning structural attachment includes a main body having a proximal end and a distal end, wherein the main body is attached to (i) a CIP of a support system and (ii) a clevis on an airframe of an aircraft. Further, the self-aligning structural attachment includes a first attachment fitting disposed on the proximal end, wherein the first attachment fitting is a slide-and-swivel attachment fitting. Still further, the self-aligning structural attachment includes a second attachment fitting disposed on the distal end, wherein the second attachment fitting is a slide attachment fitting. Yet still further, the self-aligning structural attachment includes a pivoting hinge disposed between the first attachment fitting and the second attachment fitting.

According to another exemplary arrangement, a system comprising a plurality of support systems for a crown area of an aircraft is disclosed. Each support system includes a first support-system attachment and a second support-system attachment for attaching the support system to an airframe of the aircraft. Further, the first support-system attachment includes: (a) a main body having a proximal end and a distal end, wherein the main body is attached to (i) a CIP of the support system and (ii) a clevis on the airframe of the aircraft; (b) a first attachment fitting disposed on the proximal end, wherein the first attachment fitting is a slide-and-swivel attachment fitting; (c) a second attachment fitting disposed on the distal end, wherein the second attachment fitting is a slide attachment fitting; and (d) a pivoting hinge disposed between the first attachment fitting and the second attachment fitting.

According to another exemplary arrangement, a method for attaching a plurality of support systems for a crown area of an aircraft to an airframe of the aircraft is disclosed. Each support system includes a first support-system attachment and a second support-system attachment for attaching the support system to an airframe of an aircraft. The first support-system attachment includes (i) a main body having a proximal end and a distal end, wherein the main body is configured to attach to (a) a CIP of the support system and (b) a first clevis on an airframe of an aircraft, (ii) a first attachment fitting disposed on the proximal end, wherein the first attachment fitting is a slide-and-swivel attachment fitting, (iii) a second attachment fitting disposed on the distal end, wherein the second attachment fitting is a slide attachment fitting, and (iv) a pivoting hinge disposed between the first attachment fitting and the second attachment fitting. The method includes, for each support system, (i) attaching the second support-system attachment to a second clevis on the airframe and (ii) attaching the first support-system attachment to the first clevis on the airframe. During the attaching of the first support-system attachment, the first support-system attachment self-aligns to fit into the first clevis on the airframe.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and descriptions thereof, will best be understood by reference to the following detailed description of an illustrative embodiment of the present disclosure when read in conjunction with the accompanying drawings, wherein:

FIG. 2b is a diagrammatic representation of a cross-section of the CIP of FIG. 2a;

FIG. 4b is a close-up view of a portion of the CIP of FIG. 4a;

FIG. 4c is a diagrammatic representation of a perspective view of the equipment of FIG. 4a attached to the CIP of FIG. 4a;

FIG. 11b is a diagrammatic representation of an exploded view of the adjustable fitting of the system of FIG. 10, in accordance with an exemplary embodiment;

DETAILED DESCRIPTION

Disclosed embodiments will now be described more fully hereinafter with reference to the accompanying drawings, in which some, but not all of the disclosed embodiments are shown. Indeed, several different embodiments may be provided and should not be construed as limited to the embodiments set forth herein. Rather, these embodiments are provided so that this disclosure will be thorough and complete and will fully convey the scope of the disclosure to those skilled in the art.

The present disclosure provides for embodiments of a support system for a crown area of an aircraft. Further, the present disclosure provides for embodiments of a dual-bracketed support system. Still further, the present disclosure provides for embodiments of a system for adjusting a height of a ceiling panel. Yet still further, the present disclosure provides for embodiments of a self-aligning structural attachment. The embodiments described herein are described with reference to a crown portion of an aircraft. However, the embodiments of the systems and methods disclosed may be used in other systems as well. For instance, the disclosed embodiments may be used in aircraft, spacecraft, motor craft, watercraft, and other craft, as well as vehicles and other similar structures.

1. Example Embodiments of a Support System for a Crown Portion of an Aircraft

Figure 1:
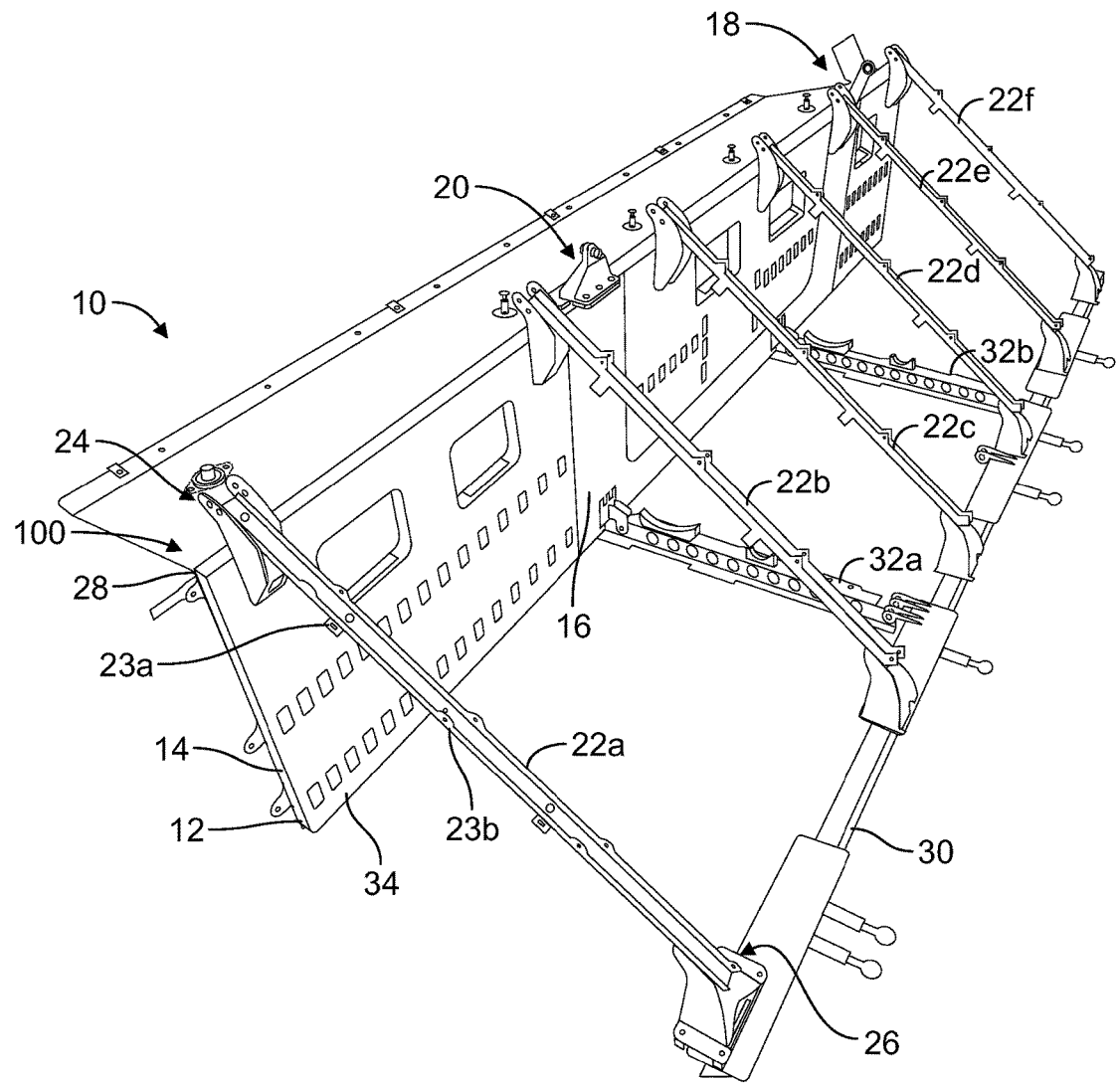
FIG. 1 depicts a diagrammatic representation of a perspective view of a support system, in accordance with an exemplary embodiment.

FIG. 1 depicts a diagrammatic representation of a perspective view of a support system 10 in accordance with an exemplary embodiment. Support system 10 includes a crown integration panel (CIP) 12 that is configured to provide a mounting surface for a plurality of aircraft equipment and to provide an electrical ground for at least one of the aircraft equipment of the plurality of aircraft equipment. CIP 12 includes a honeycomb panel 14 and sheet metal 16.

Support system 10 also includes a first attachment 18 and a second attachment 20 configured to attach to the CIP 12. The first attachment 18 and the second attachment 20 are further configured to attach to an airframe of the aircraft and to provide support for the CIP 12. The first attachment 18 and the second attachment 20 may, for example, provide vertical and lateral support for the CIP 12 when the CIP 12 is attached to the airframe.

Support system 10 also includes one or more crown raceway supports (CRSs). For instance, in the example of FIG. 1, support system 10 includes CRSs 22a-f. However, the support system 10 may include more CRSs or fewer CRSs. These CRSs are described in more detail with reference to CRS 22a. CRS 22a has a first end 24 and a second end 26. The first end 24 of the CRS 22a is configured to be attached to a first end 28 of the CIP 12, and the second end 26 of the CRS 22a is configured to be attached to an outboard rail of the aircraft, such as outboard bin rail 30. The outboard rail may be attached to an airframe of the aircraft.

CRS 22a may be used to support various aircraft equipment. In an example embodiment, CRS 22a includes a plurality of attachments each configured to hold one or more wires or wire bundles. For instance, CRS 22a includes attachments 23a and 23b that can support one or more wires or bundles.

Support system 10 also includes one or more lateral support arms. For instance, in the example of FIG. 1, support system includes support arms 32a-b. However, the support system 10 may include more support arms or fewer support arms. These lateral support arms are described in more detail with reference to lateral support arm 32a. Lateral support arm 32a is connected to a second end 34 of the CIP and to the outboard bin rail 30. The lateral support arm 32a may serve to support various aircraft equipment. For instance, in an embodiment, lateral support arm 32a provides a lateral load path for aircraft equipment connected to the CIP 12. Further, in an embodiment, the lateral support arm 32a serves to support ceiling panels of the aircraft cabin. Lateral support arm 32a may be configured to receive a plurality of ceiling support brackets.

Figure 2A:
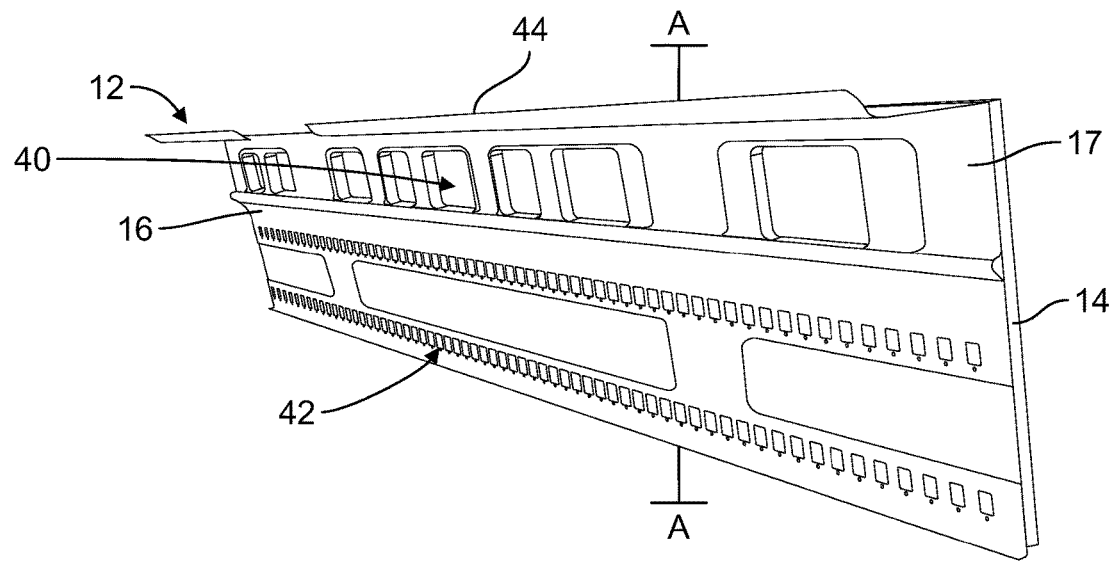
FIG. 2a is a diagrammatic representation of a perspective view of a crown integration panel (CIP), in accordance with an exemplary embodiment.
Figure 2B:
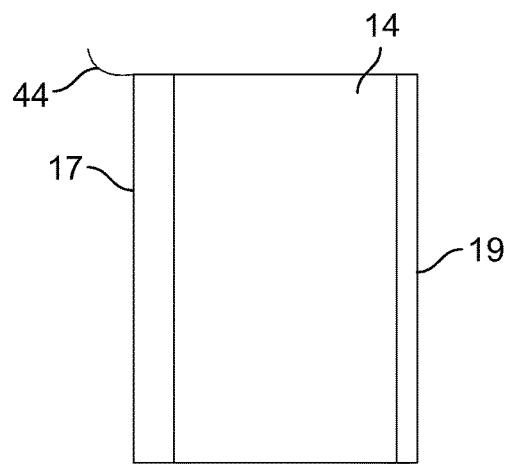

As mentioned above, support system 10 includes CIP 12. CIP 12 is described in more detail with reference to FIGS. 2a-b. FIG. 2a is a diagrammatic representation of a perspective view of CIP 12, and FIG. 2b is a diagrammatic representation of a cross-section through line A-A of the CIP 12.

In an example embodiment, sheet metal 16 includes a plurality of face sheets. For instance, as shown in FIG. 2b, the honeycomb panel 14 is disposed between first metal face sheet 17 and second metal face sheet 19. First metal face sheet 17 and second metal face 19 sheet increase the vibrational stiffness of the honeycomb panel 14. Further, the metal face sheets 17, 19 provide an electrical ground for electronic equipment in the crown of the aircraft.

In order to provide support for various aircraft equipment, CIP 12 may include a plurality of wire pass-through holes and a plurality of equipment-attachment holes. For instance, FIG. 2a shows a plurality of wire pass-through holes 40 and a plurality of equipment-attachment holes 42.

In an example embodiment, the thickness of the honeycomb panel 14, the first metal face sheet 17, and the second metal face sheet 19 are selected such that the CIP has a vibrational stiffness resulting in a threshold natural resonance frequency. Further, the number and location of the plurality of wire pass-through holes 40 and the plurality of equipment-attachment holes 42 may be selected such that the CIP has the vibrational stiffness resulting in a threshold natural resonance frequency.

In an example embodiment, the threshold natural resonance frequency is at least 14 hertz (Hz). Such a threshold natural resonance frequency may help to prevent compromise of the electrical equipment and wiring that the CIP 12 supports. However, in other example embodiment, the natural resonance frequency may be greater than or less than 14 Hz. For instance, in an example embodiment, the threshold natural resonance frequency is at least 12 Hz. In another example embodiment, the threshold natural resonance frequency is at least 16 Hz. Other examples are possible as well.

In a particular example embodiment, CIP 12 has a height of about 19 inches and a length of about 110 inches, and the honeycomb panel 14 is a fiberglass honeycomb panel having a thickness of about 0.75 inches. Further, the first metal face sheet 17 is an aluminum face sheet has a thickness of about 0.032 inches, and the second metal face sheet 19 is an aluminum face sheet having a thickness of about 0.04 inches. However, other lengths, heights, widths, and materials may be used to achieve the threshold natural resonance frequency.

In an example embodiment, CIP 12 may include a drip shield that is integrated into one of the metal face sheets. For example, as shown in FIG. 2a, first metal face sheet 17 forms drip shield 44. The drip shield 44 may beneficially serve to protect aircraft equipment attached to the CIP 12 from condensation that may occur during flight.

The disclosed CIP provides a weight-efficient panel with a threshold natural vibrational resonance frequency that prevents compromise of the electrical equipment and wiring that the CIP supports. For example, a threshold natural resonance frequency may help to withstand emergency conditions, such as a windmilling condition. The honeycomb panel supplies an increased moment of inertia and thus increases the vibrational stiffness of the CIP (resulting in a higher natural resonance frequency). Further, the metal face sheets added at select locations further improve vibrational properties. Still further, the metal face sheets provide a reliable electrical ground path. As a result, the disclosed CIP also has sufficient electrical conductivity to provide a ground plane for electrical equipment mounted to the CIP or elsewhere. Further, the CIP allows for multiple attachment locations, and this helps to reduce or eliminate the need for expensive potted inserts or specialized fasteners to attach equipment to the panel.

As mentioned above, a plurality of aircraft equipment may be attached to the support system 10. Support system 10 is configured to support various aircraft equipment and also variable configurations of the equipment. This equipment may include various equipment used in the crown of an aircraft, including but not limited to electronic systems, ECSs, and interior lining of the aircraft such as ceiling and light systems.

Figure 3:
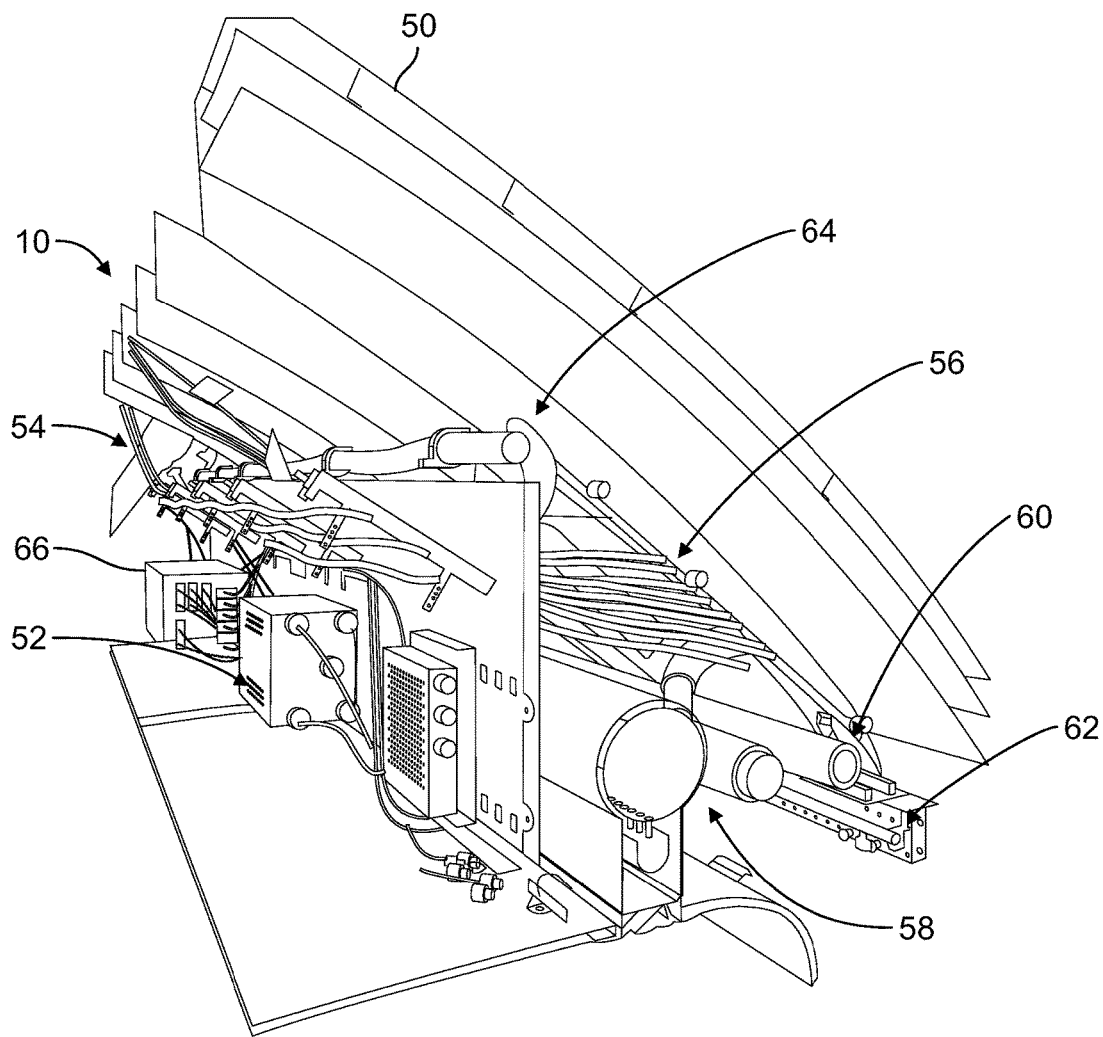
FIG. 3 depicts a diagrammatic representation of a perspective view of the support system of FIG. 1 attached to an airframe of an aircraft, in accordance with an exemplary embodiment.

FIG. 3 depicts a diagrammatic representation of a perspective view of the support system 10 after a plurality of aircraft equipment has been attached to the support system 10 and after the support system 10 has been attached to airframe 50. In the example shown in FIG. 3, support system 10 is supporting electrical equipment 52, a first bundle 54 of wires, and a second bundle 56 of wires. Further, the support system 10 is supporting environmental control system (ECS) components, such as ECS duct 58 and ECS gasper 60. Still further, support system 10 is supporting an oxygen line 62, a water line 64, and a power feeder 66. In an example embodiment, the support system also supports a leaky feeder 68 (see FIG. 5b).

The example of FIG. 3 is intended as an example only, and it should be understood that more equipment items, fewer equipment items, and/or different equipment items may be attached to the support system 10. In general, support system 10 can be customized as desired based on the requirements of the particular aircraft customer.

In an example embodiment, support system 10 may be customized based on the particular aircraft equipment to be installed in the crown portion of the aircraft. As mentioned above with respect to FIG. 2a, CIP 12 includes a plurality of wire pass-through holes 40 and a plurality of equipment-attachment holes 42. Thus, the CIP 12 is configured to allow a variety of electrical equipment to be attached to the CIP at various locations, and this allows for a high degree of customization.

Figure 4B:
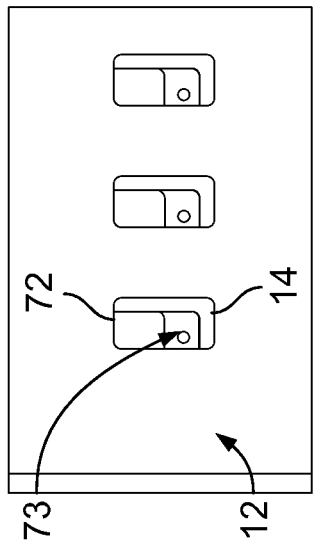
Figure 4C:
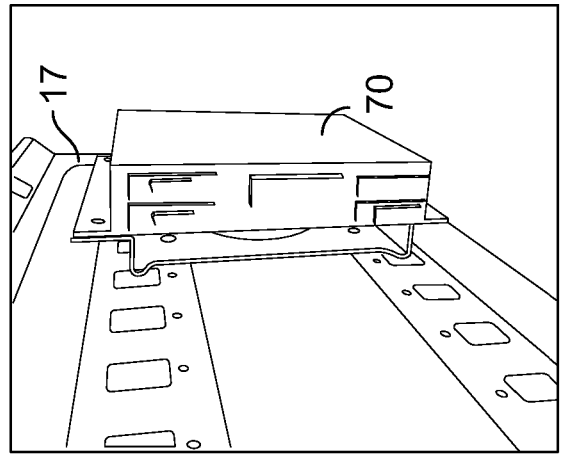
Figure 4A:
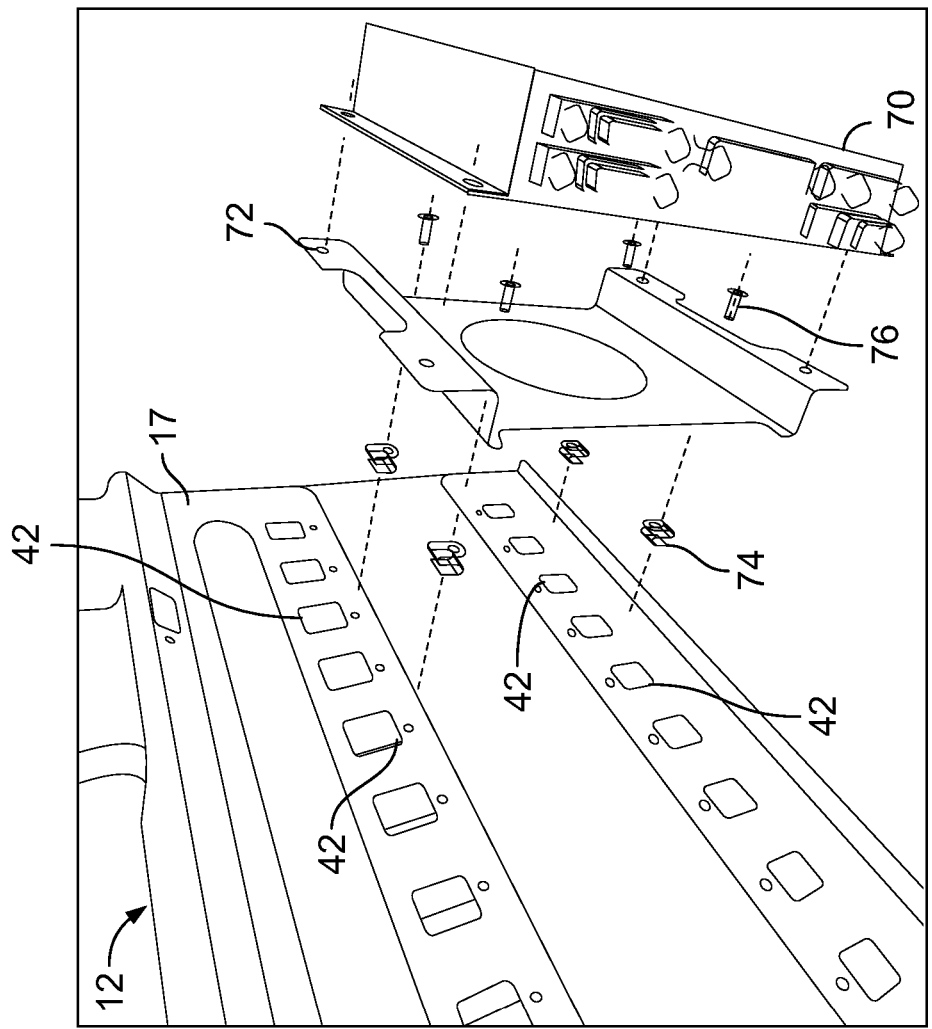
FIG. 4a is a diagrammatic representation of an exploded perspective view of example aircraft equipment attached to the CIP of FIG. 2a, in accordance with an exemplary embodiment.

Electrical equipment may be attached to CIP 12 in any suitable fashion. In an example embodiment, equipment may be attached to the CIP 12 by using clip nuts, an adapter sheet, and screws. For instance, FIGS. 4a-c depict an example of attaching an electrical equipment item to CIP 12. As shown in FIG. 4b, the equipment-attachment holes 42 may include an edge of sheet metal forming an extension 73 extending beyond the honeycomb panel 14, and this extension 73 enables the use of a convention clip nut. An adapter sheet such as adapter sheet 72 may allow for electrical equipment of various sizes to be easily attached to the CIP 12. Electrical equipment 70 item is attached to adapter sheet 72. Clip nuts 74 and screws 76 may then be used to attach the adapter sheet 72 to the CIP 12 at selected equipment-attachment holes 42. In another example embodiment, equipment may be attached to the CIP without the use of an adapter sheet.

Figure 5A:
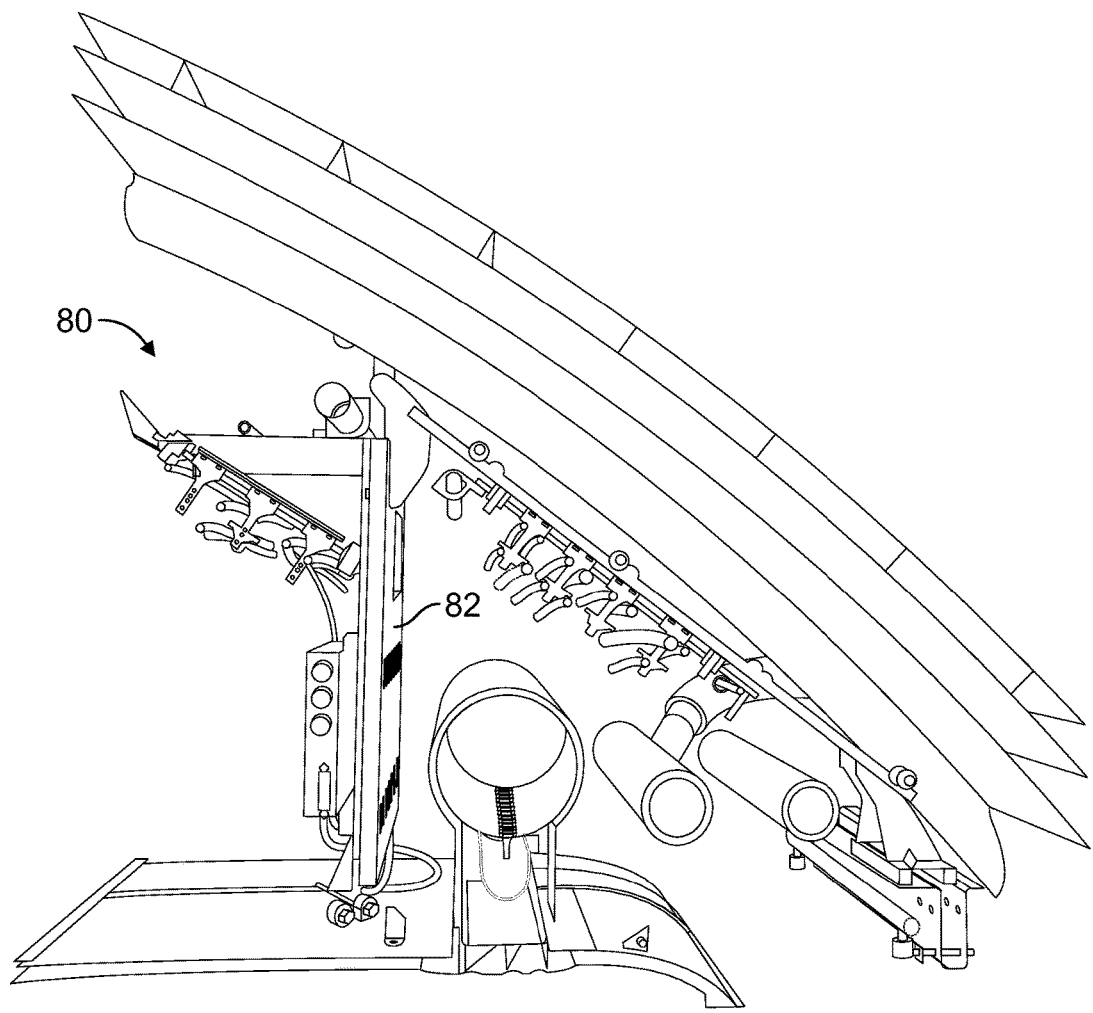
FIG. 5a is a diagrammatic representation of a perspective view of a cross section of a support system, in accordance with an exemplary embodiment.
Figure 5B:
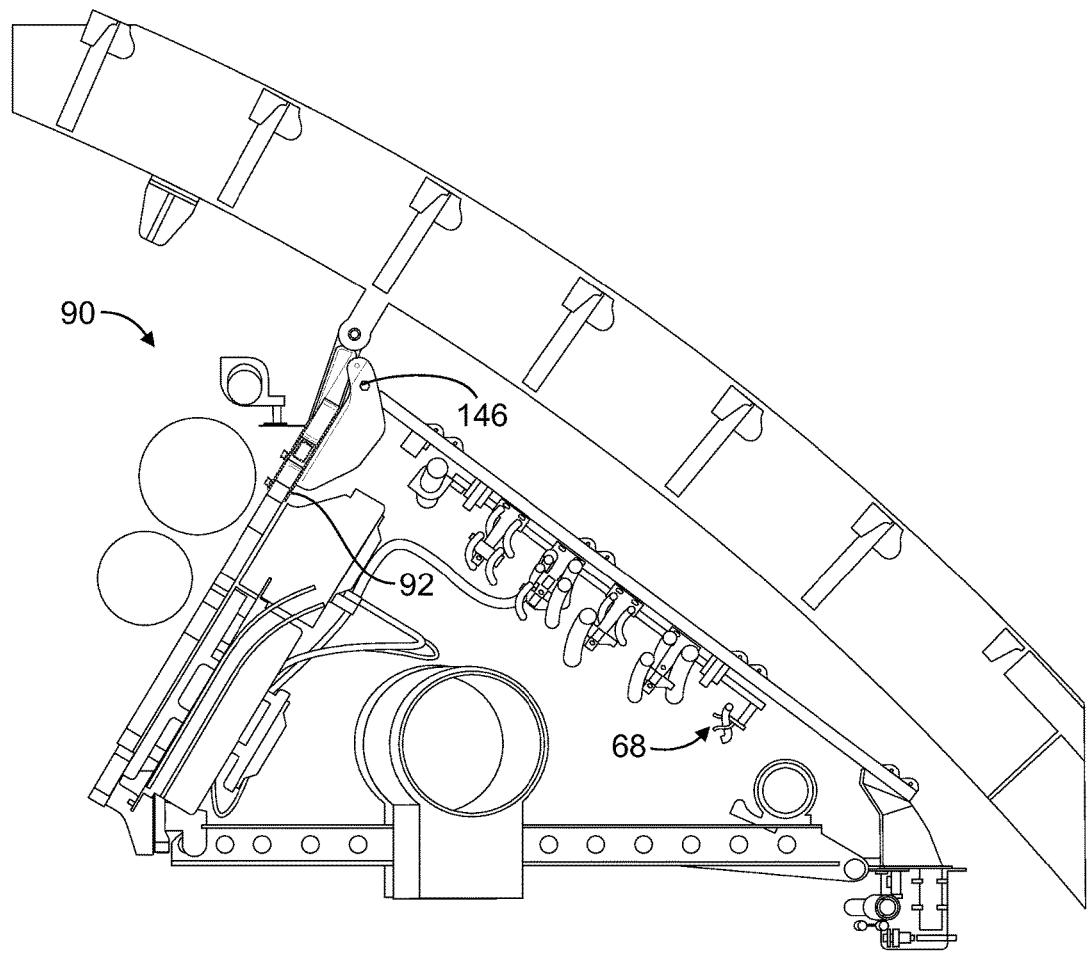
FIG. 5b is a diagrammatic representation of a perspective view of a cross section of a support system, in accordance with an exemplary embodiment.

The support system 10 may also be customized based on the space available in the crown portion of the aircraft. In this regard, the orientation of the CIP 12 may be adjusted as necessary based on space available in the crown and/or the size and type of equipment to be supported by the support system 10. For instance, in an example embodiment, when installed in the aircraft, the CIP may be arranged in a substantially vertical orientation, as shown in FIG. 5a. In particular, FIG. 5a shows a support system 80 having a CIP 82 arranged in a substantially vertical orientation. In another example embodiment, the CIP may be arranged in a slanted orientation, as shown in FIG. 5b. In particular, FIG. 5b shows a support system 90 having a CIP 92 arranged in a slanted orientation. In a particular example, the orientation of the CIP may be slanted to accommodate an overhead flight crew rest. Further, adjusting the orientation of the CIP may be useful for allowing for different arrangements of aircraft equipment that are supported by the support system.

In addition to being a highly customizable support system that can adjust arrangement of the support system and its attached components depending on the particular aircraft customer, the disclosed support system 10 also allows for the assembly of the support system 10 and attachment of equipment to be performed outside of the aircraft. This results in an improved process for assembling and installing the secondary support structure for a crown portion of an aircraft.

In an example embodiment, during the manufacturing of an aircraft, the aircraft equipment can be attached to the support system 10 outside of the aircraft (e.g., at the feederline outside the aircraft). Further, a plurality of support systems can be assembled and attached to one another outside of the aircraft. For instance, support system 10 can be attached to one or more other support systems having a CIP. The bundle of the two or more support systems with the equipment already attached may then be transported inside the airframe of the aircraft and then attached to the airframe.

Figure 6:
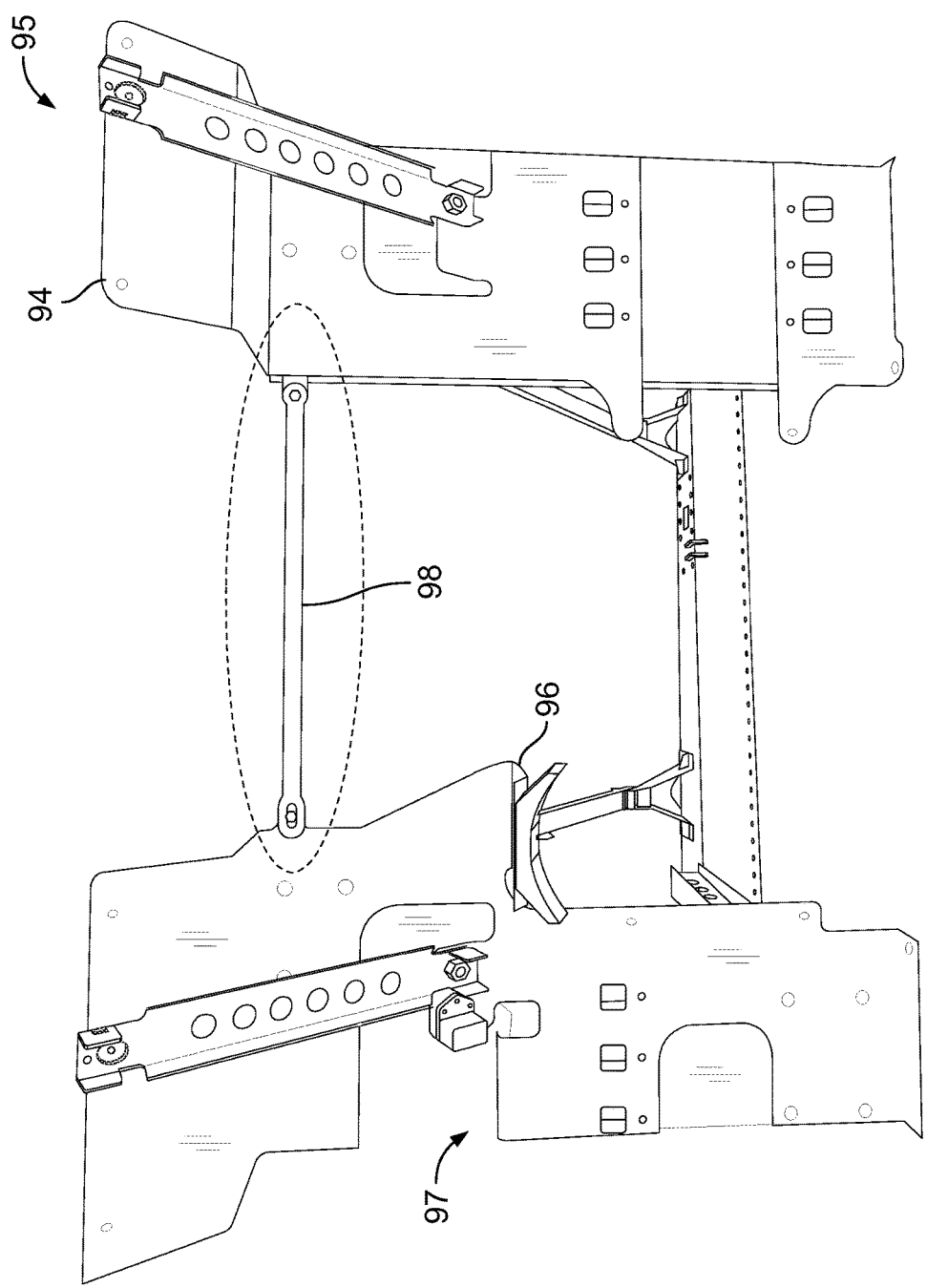
FIG. 6 is a diagrammatic representation of a perspective view of a first CIP attached to a second CIP, in accordance with an exemplary embodiment.

FIG. 6 depicts an end of a first CIP 94 of a first support system 95 attached to an end of a second CIP 96 of a second support system 97. A support strap 98 may be used to connect the two CIPs together. As explained above with reference to FIG. 1, the CIP of a support system is attached to the airframe using two attachments such as attachments 18 and 20. These attachments will typically carry the load for supporting the respective CIPs. However, the support strap may serve as a redundant support. In an example embodiment, each support system in a bundle of support systems is connected to at least one other support system by a respective connecting support strap.

In an example embodiment, some of the aircraft equipment attached to a support system may span multiple support systems. For example, wiring, ECS components, oxygen and water lines typically will span more than one support system. Attaching such components to the plurality of support systems outside of the aircraft may be more convenient and less time intensive than would be possible in existing methods where the components are attached to the secondary support structure inside the aircraft. For example, by allowing manufactures to attach the aircraft equipment of the support system outside of the aircraft, the disclosed support system beneficially provides the manufacturers more space to perform the assembly than would be available inside of the aircraft. This additional space may not only provide a safer working environment (e.g., as personnel have more room to operate and are not operating in cramped spaces), but the additional space may also help to reduce the amount of time required for attaching the aircraft equipment (e.g., as the equipment may be more easily attached in a more convenient position than would be possible inside the airframe).

After assembling the bundle of support systems with attached equipment outside of the aircraft, the assembled bundle of support systems may then be moved inside the aircraft and attached to the airframe. In order to attach the support system 10 to the aircraft, the first attachment 18 and the second attachment 20 are attached to the airframe. In an example embodiment, the first attachment 18 and the second attachment 20 are the only attachments attaching the first end 28 of the CIP 12 to the airframe 50. The first attachment 18 and the second attachment 20 are configured to allow the CIP freedom to move with body deflections of the airframe. These attachments 18 and 20 will be described in more detail below with reference to FIGS. 12-18.

2. Example Embodiments of a Dual-Bracketed Support System

As mentioned above, the present disclosure also provides for embodiments of a dual-bracketed support system. In an embodiment, the disclosed dual-bracketed support system is configured for use in the disclosed support system for a crown area of an aircraft, such as support system 10.

As described with reference to FIG. 1, the support system 10 includes one or more CRSs (e.g., CRSs 22a-22f). Further, each CRS has a first end 24 and a second end 26, where the first end 24 of the CRS is configured to attach to a first end 28 of the CIP 12 and the second end 26 of the CRS is configured to attach to an outboard bin rail 30 of the aircraft. A dual-bracketed support system 100 serves to attach the CRS (22a-22f) to the CIP 12 and to the outboard bin rail 30. Further, the dual-bracketed support system 100 provides beneficial functionality during the assembly process as well as during flight of the aircraft.

The dual-bracketed support system 100 is described in greater detail with respect to FIGS. 7, 8a-b, and 9a-b. Dual-bracketed support system 100 includes a first bracket 102, a second bracket 104, and a support rod 106. Support rod 106 includes a proximal end 108 and a distal end 110. The proximal end 108 is connected to first bracket 102, and the distal end 110 is connected to the second bracket 104. Support rod 106 is a "u" shaped extrusion that has spaced holes for mounting various items such as fasteners and hardware. Second bracket 104 is configured to allow the support rod to translate along a longitudinal axis 114 defined by the support rod 106.

Support rod 106 may be attached to first bracket 102 with a fastener, such as a tightened fastener or a pin fastener. In an example embodiment of a vertical CIP (such as CIP 82 shown in FIG. 5a), the fastener is a tightened fastener. In an example embodiment of a slanted CIP (such as CIP 92 shown in FIG. 5b), the fastener is a horizontal pin fastener. Other examples are possible as well.

Figure 7:
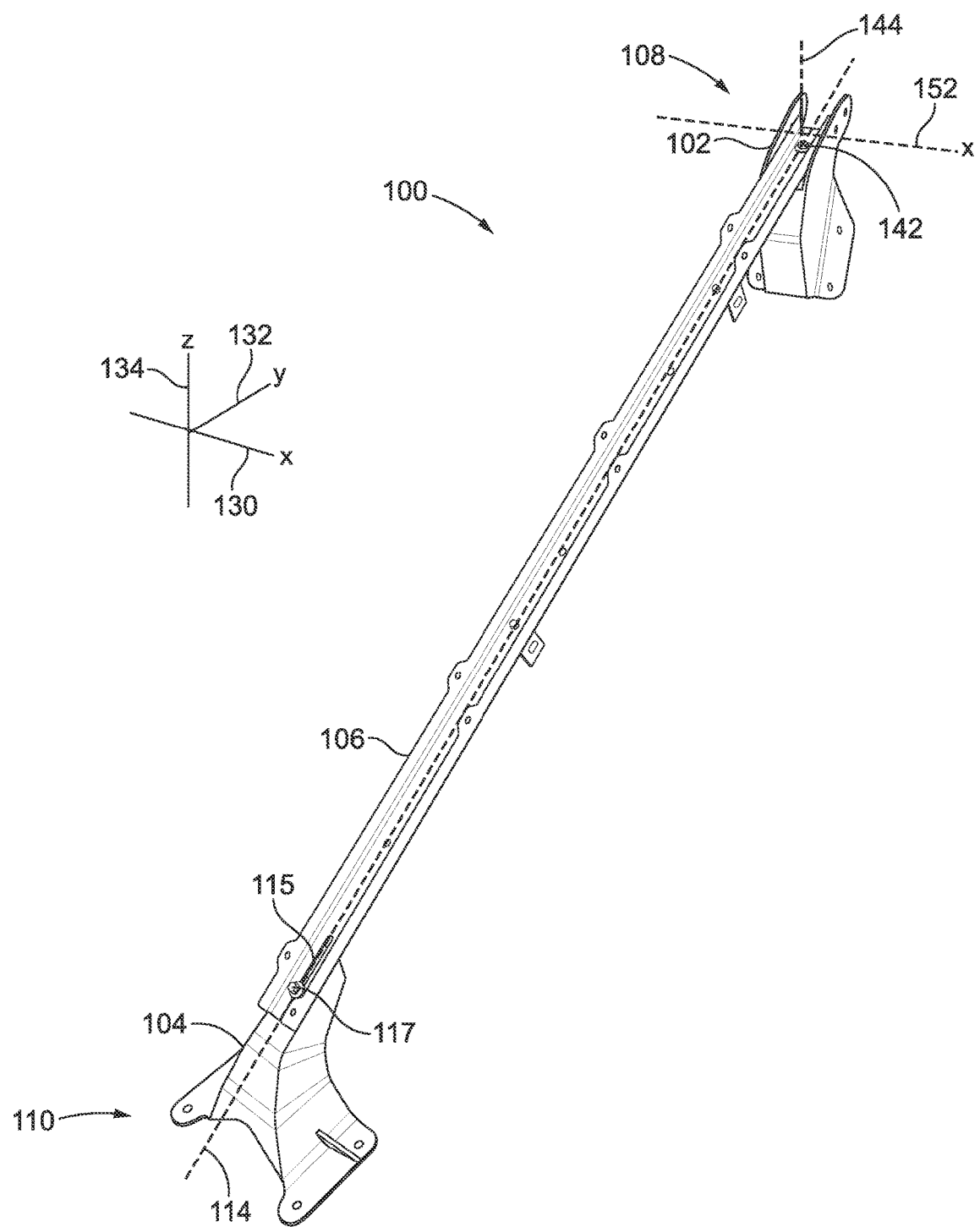
FIG. 7 is a diagrammatic representation of a perspective view of a dual-bracketed support system, in accordance with an exemplary embodiment.
Figure 8A:
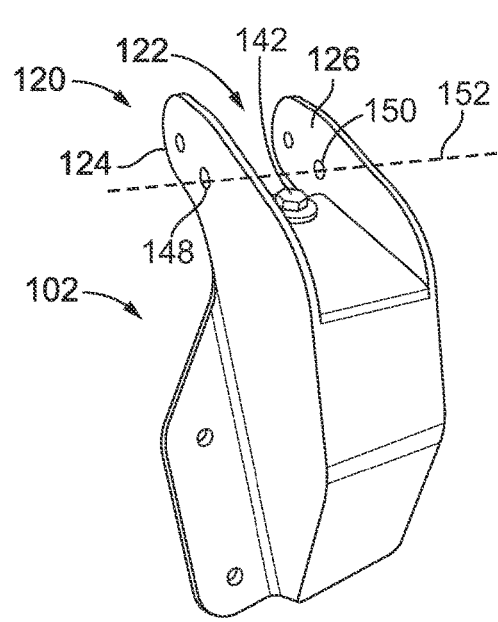
FIGS. 8a-b are diagrammatic representations of front and back, respectively, perspective views of an attachment of the dual-bracketed support system of FIG. 7, in accordance with an exemplary embodiment.
Figure 8B:
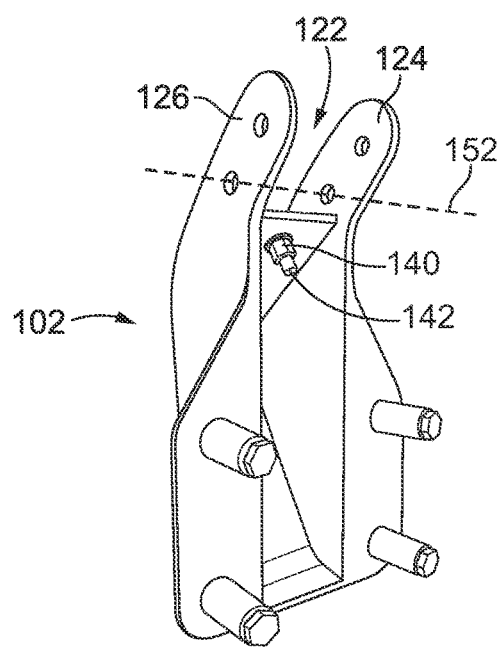

First bracket 102 is shown in greater detail in FIGS. 8a-b. The example shown in FIG. 8a-b shows a tightened fastener comprising a nut 140 (see FIG. 8b) and bolt 142. In an example embodiment, the first bracket 102 may limit or prevent rotation and translation of the support rod relative to the first bracket. With reference to FIGS. 7 and 8a-b, support rod 106 is connected to first bracket 102 with nut 140 and bolt 142. Further, first bracket 102 includes a slot 122 having a first end 124 and a second end 126, and this slot 122 may be configured to receive proximal end 108 of support rod 106. Slot 122 and proximal end 108 may have the same or substantially the same width. Slot 122 in combination with nut 140 and bolt 142 may act to prevent both translation and rotation of the support rod relative to first bracket 102.

In another example embodiment, however, the width of slot 122 may be greater than the width of the proximal end 108, and thus the slot 122 may allow limited rotation about axis 144 which is perpendicular to nut 140 and bolt 142.

Figure 9A:
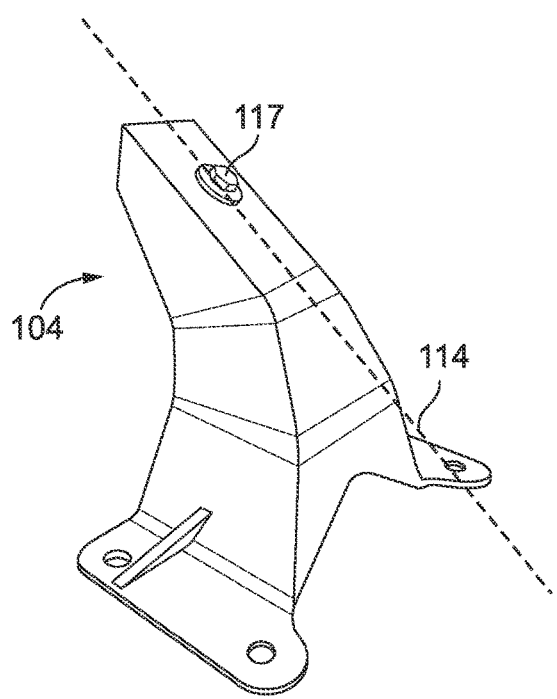
FIGS. 9a-b are diagrammatic representations of front and back, respectively, perspective views of another attachment of the dual-bracketed support system of FIG. 7, in accordance with an exemplary embodiment.
Figure 9B:
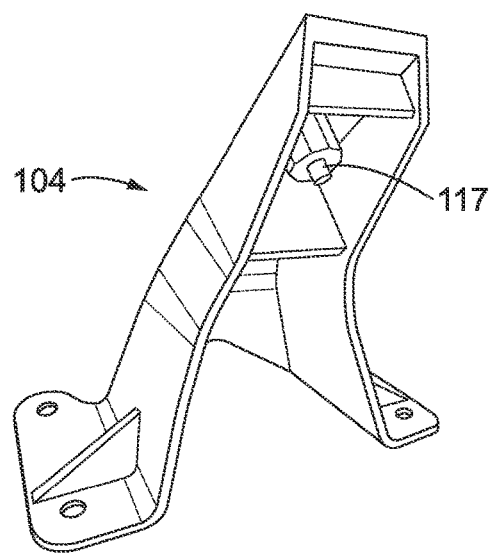

Second bracket 104 is shown in greater detail in FIGS. 9a-b. As mentioned above, second bracket 104 allows for movement along longitudinal axis 114 defined by the support rod 106. In an example embodiment, the second bracket 104 is further configured to prevent rotations and to prevent translations other than translation along longitudinal axis 114 defined by the support rod 106. The support rod 106 includes a slot 115 configured to allow the support rod 106 to slide while attached to the second bracket 104. In an example embodiment, the second bracket 104 includes a single tightened fastener 117. This single tightened fastener with slot provides stiffness for vibration control while limiting load transfer to the outboard rail. Further, the single tightened fastener 117 may move within slot 115 when the support rod 106 translates along the longitudinal axis 114 defined by the support rod 106. In another example embodiment, the second bracket includes a slot configured to receive the support rod, and the slot in the second bracket is configured to allow the support rod to translate along the longitudinal axis defined by the support rod.

In an example, the support rod 106 remains stationary relative to the second bracket 104 when the load is less than a threshold load. However, the support rod 106 may translate along longitudinal axis 114 defined by the support rod 106 when the threshold load is reached. In an example embodiment, during normal flight conditions of the aircraft (e.g., take off, landing, flight, maneuvering during flight), the load on the support rod may be about 10 to 20 pounds of load. Under this load, the support rod 106 remains stationary in the second bracket. However, when a threshold load is exceeded, the support rod 106 translates along longitudinal axis 114 defined by the support rod 106. By doing so, the support rod 106 will limit or prevent the outboard rail from taking at least a portion of the load. This may help to avoid breaking of the outboard rail. In an example embodiment the threshold load is 200 pounds. However, in other example embodiment, the threshold load may be greater than or less than 200 pounds. For instance, in an example embodiment, the threshold load is at least 100 pounds. In another example embodiment, the threshold load is at least 250 pounds. In yet another example embodiment, the threshold load is at least 500 pounds. Other examples are possible as well.

Although a tightened fastener (nut 140 and bolt 142) for the first bracket 102 is shown in FIGS. 7 and 8a-b, other fasteners such as a pin fastener may also be used. In an example embodiment, a pin fastener such as pin fastener 146 (see FIG. 5b) is used to connect the support rod 106 to first bracket 102. In an example, pin fastener 146 is placed through hole 148 in first end 124 and hole 150 in second end 126. Pin fastener 146 (see FIG. 5b) may allow the support rod 106 to rotate about a longitudinal axis 152 (see FIG. 8a) defined by the pin fastener 146.

FIG. 7 depicts X axis 130, Y axis 132, and Z axis 134. In an example embodiment, motion along the X axis 130 corresponds to fwd/aft motion, motion along the Y axis 132 corresponds to inboard/outboard motion, and motion along Z axis 134 corresponds to up/down motion. Therefore, in an example embodiment, motion along a longitudinal axis 114 defined by the support rod 106 may correspond to motion in the YZ direction (e.g., inboard/outboard and up/down motion). Further, in an example, axis 152 is parallel or substantially parallel to X axis 130. Therefore, in an example embodiment where the first bracket 102 allows for rotation about longitudinal axis 152 defined by pin fastener 146, the rotation about longitudinal axis 152 may correspond to up and down rotation about axis 152.

As explained above with reference to FIG. 1, one or more wires can be attached to the CRS. In an example embodiment, the attachment includes support for wires routed both parallel to (outboard of the CIP) and perpendicular to the CRS. Additional routings that are parallel to the CRS include lavatory and galley vents, tubes and waterlines, one or more of which may lead to outboard sidewall interior monuments, e.g., lavatories and galleys. In an example embodiment, during installation, the first bracket 102 may be attached to a CIP such as CIP 12. Further, the CRS support rod 106 can be rotated by installation personnel to an orientation that is most convenient for attaching the wires to the support rod 106. For instance, the CIP may be arranged along or substantially along Z-axis 134, and the support rod may be positioned in the orientation depicted in FIG. 7. Rather than installing the wires with the support rod 106 in the orientation shown in FIG. 7, support rod 106 may be rotated a desired number of degrees about an axis such as axis 152. For instance, support rod could be rotated at least about 90 degrees. In this orientation, the support rod 106 may be positioned in a more convenient position for attaching the plurality of wires. Thus, wire bundles can be pre-installed to the CRS 22a in a more comfortable position, with convenient access and with less effort, than would be possible in existing systems (e.g., existing systems where the wires are installed inside the aircraft). These factors may beneficially help to reduce manufacturing costs, improve safety, and allow for production rate increases.

Further, in addition to providing beneficial functionality during the assembly process, the dual-bracketed support system 100 may also provide beneficial functionality during flight of the aircraft. The dual-bracketed support system 100 may be used to attach the CRS (such as CRS 22a) to a CIP and to an outboard rail (such as CIP 12 and outboard bin rail 30 shown in FIGS. 1 and 3). During flight conditions, aircraft structures are commonly subject to deflections due to various static and dynamic loads. For example, expansions and contractions may occur to aircraft structures due to cabin pressurization and temperature gradients. Further, flexing may occur due to gravitational, inertial, and aerodynamic forces. Beneficially, the dual-bracket support system 100 serves to adapt to these deflections.

In particular, the outboard bin rail 30 to which the second bracket 104 is attached will typically be longer than the CIP 12 to which the first bracket 102 is attached. Further, during flight, both the outboard bin rail 30 and the CIP 12 will be subject to thermal expansion and/or contraction. Since the outboard rail is typically longer than the CIP 12, the outboard bin rail 30 will typically expand more than the CIP 12. This will cause relative movement between the first bracket 102 and the second bracket 104 of the dual-bracketed system 100. By allowing for translation of the distal end 110 along longitudinal axis 114 defined by the support rod 106, the second bracket 104 accommodates this relative movement.

This self-adjustment may reduce or prevent strain on equipment attached to the support rod 106, such as one or more wires. Further, the self-adjustment may also help to reduce the magnitude of the load on the outboard bin rail 30. The dual-bracketed support system 100 limits or prevents the support rod 106 moving in the fore-aft and up-and-down directions relative to the outboard bin rail 30. However, the dual-bracketed system 100 allows for inboard-outboard movement and limited angular displacement. This permits the support rod 106 to self-adjust for motion of the structure that supports the proximal end 108 of the support rod 106 relative to the structure that supports the distal end 110 of the support rod 106. This reduces or eliminates cyclic loading on the support rod 106, and it also reduces the magnitude of the load on the outboard bin rail 30 (in favor of loading more on the airframe supporting the proximal end 108 of the support rod 106.) Therefore, the dual bracketed support system 100 may help to reduce load on the outboard bin rail 30. Since the outboard bin rail 30 will be subject to load during flight, reducing the load on the outboard bin rail 30 may be advantageous.

3. Example Embodiments of a System for Adjusting a Height of an Aircraft Ceiling Panel As mentioned above, the present disclosure also provides for embodiments of a system for adjusting a height of a ceiling panel. In an embodiment, the disclosed system for adjusting a height of a ceiling panel is configured for use in the disclosed support system for a crown area of an aircraft, such as support system 10.

Figure 10:
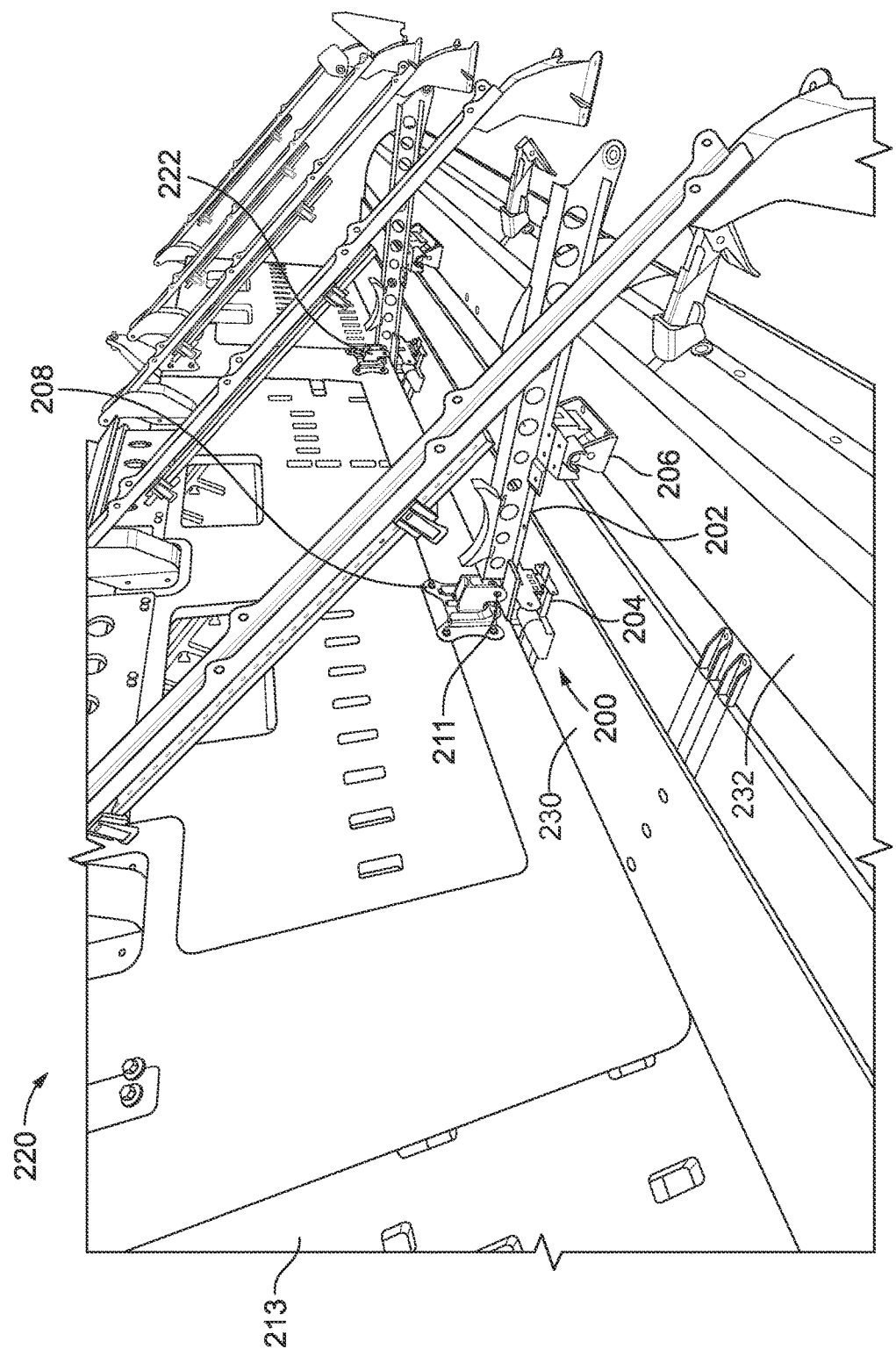
FIG. 10 is a diagrammatic representation of a perspective view of a system for adjusting a height of an aircraft ceiling panel, in accordance with an exemplary embodiment.
Figure 11A:
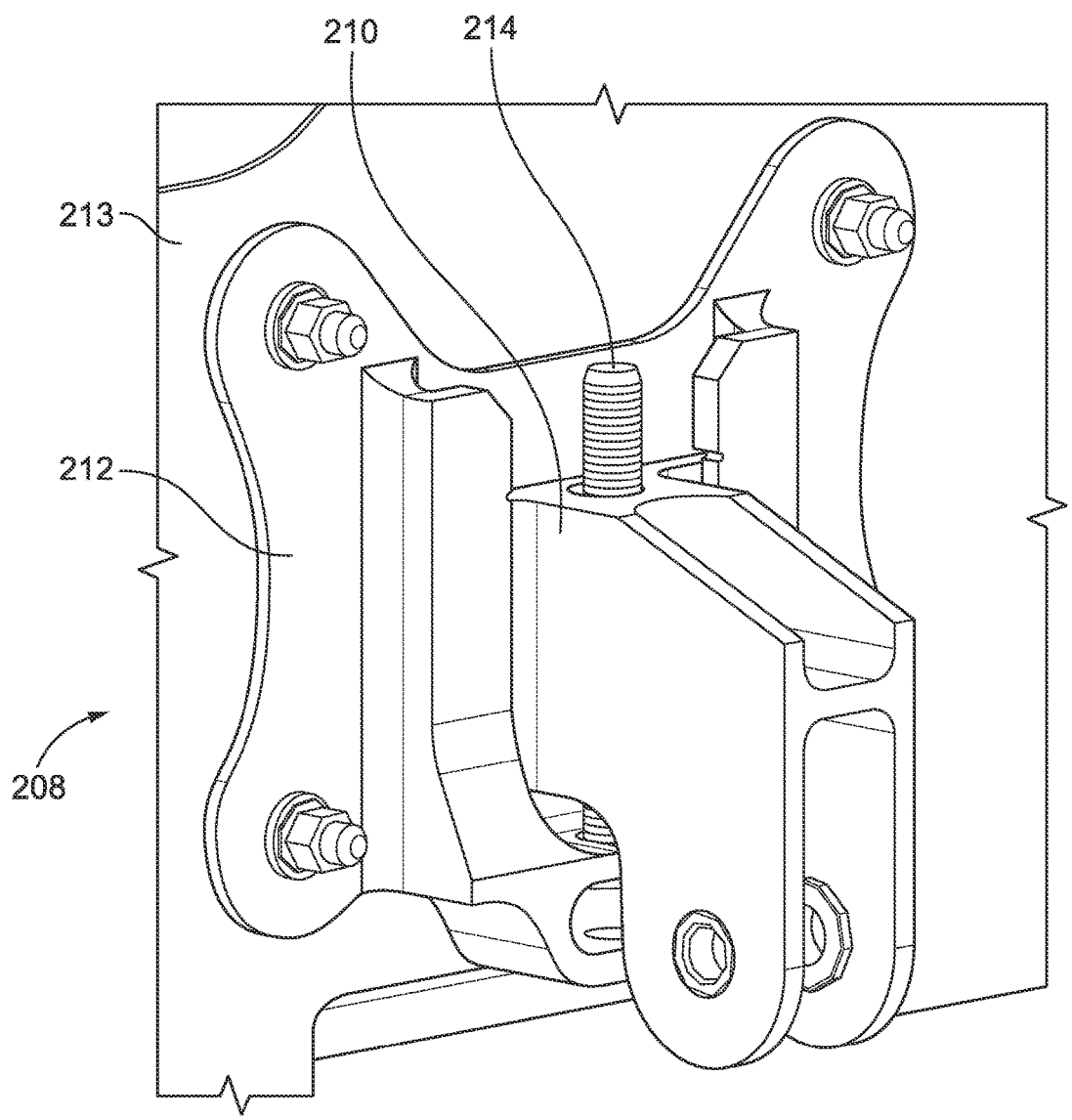
FIG. 11a is a diagrammatic representation of a perspective view of an adjustable fitting of the system of FIG. 10, in accordance with an exemplary embodiment.

An example system for adjusting a height of a ceiling panel in an aircraft is described in greater detail with respect to FIGS. 10, 11a, and 11b. In particular, FIG. 10 is a diagrammatic representation of a perspective view of a system 200 for adjusting a height of an aircraft ceiling panel, FIG. 11a is a diagrammatic representation of a perspective view of an adjustable fitting of the system 200, and FIG. 11b is an exploded view of the adjustable fitting.

System 200 includes an arm 202, ceiling support latches 204 and 206, and an adjustable fitting 208 attached to the arm 202. Ceiling support latches 204 and 206 are attached to the arm 202. These support latches are configured to receive and hold at least one ceiling panel. In an example embodiment, ceiling support latch 204 receives and holds a first ceiling panel 230, and ceiling support latch 206 receives and holds a second ceiling panel 232. In another embodiment, the ceiling support latches 204 and 206 receive and hold a single ceiling panel.

Further, with reference to FIG. 10 and FIGS. 11a-b, the adjustable fitting 208 includes (i) a first sliding block 210 (see FIG. 11a) attached to the arm 202 (see FIG. 10). In an example embodiment, a pin 211 (see FIG. 10) attaches the first sliding block 210 to arm 202. The adjustable fitting 208 also includes a second sliding block 212 (see FIG. 11a), which is attached to CIP 213. The second sliding block 212 may be attached to the CIP 213 in any suitable way. In an example, at least one screw attaches the sliding block 212 to CIP 213.

Further, as shown in FIGS. 11a-b, the adjustable fitting 208 includes an adjustment screw 214. The adjustment screw 214 includes a thread 215 configured to interact with a corresponding thread 217 of the first sliding block 210 (see FIG. 11b). Adjustment of the adjustment screw 214 forces the first sliding block 210 and the second sliding block 212 to move relative to one another. In an example embodiment, the second block 212 remains stationary with respect to CIP 213 and the first block 210 moves relative to the second block 212 and the CIP 213. The adjustment screw 214 may be adjusted in any suitable fashion. In an example embodiment, adjustment screw 214 is configured to be driven by a hex key or a screwdriver.

This disclosed system for adjusting a height of a ceiling panel in an aircraft beneficially allows for conveniently adjusting the height of the ceiling, so as to properly align the ceiling panels in an aircraft. The proposed system both simplifies and reduces time for installing and aligning aircraft cabin ceilings compared to existing systems and methods for installing and aligning aircraft cabin ceilings.

In an example embodiment, before a support system is attached to the airframe of an aircraft, the installation personnel may adjust respective adjustment screws in the support system to ensure that the ceiling panels will be properly aligned when the ceiling panels are attached to the respective lateral arms 202. After aligning the lateral arms 202 by adjusting the respective adjustment screws 214, the ceiling panels 230, 232 may be attached to the lateral arms 202 via ceiling support latches 204, 206. For example, with reference to FIG. 10, in addition to adjustable fitting 208, support system 220 includes adjustable fitting 222. Adjustable fitting 222 is located at a different position than adjustable fitting 208. However, adjustable fitting 222 is substantially identical to adjustable fitting 208. Before attaching support system 220 to an airframe, installation personnel may adjust adjustment screws in adjustable fittings 208 and 222 to ensure that ensure that the ceiling panels will be properly aligned when the ceiling panels are attached to the respective lateral arms 202. After attaching a ceiling panel to each arm 202, a height of each ceiling panel may be aligned with respective heights of the other ceiling panels.

4. Example Embodiments of a Self-Aligning Structural Attachment

As mentioned above, the present disclosure also provides for embodiments of a self-aligning structural attachment. In an embodiment, the disclosed self-aligning structural attachment is configured for use in the disclosed support system for a crown area of an aircraft, such as support system 10.

Figure 13:
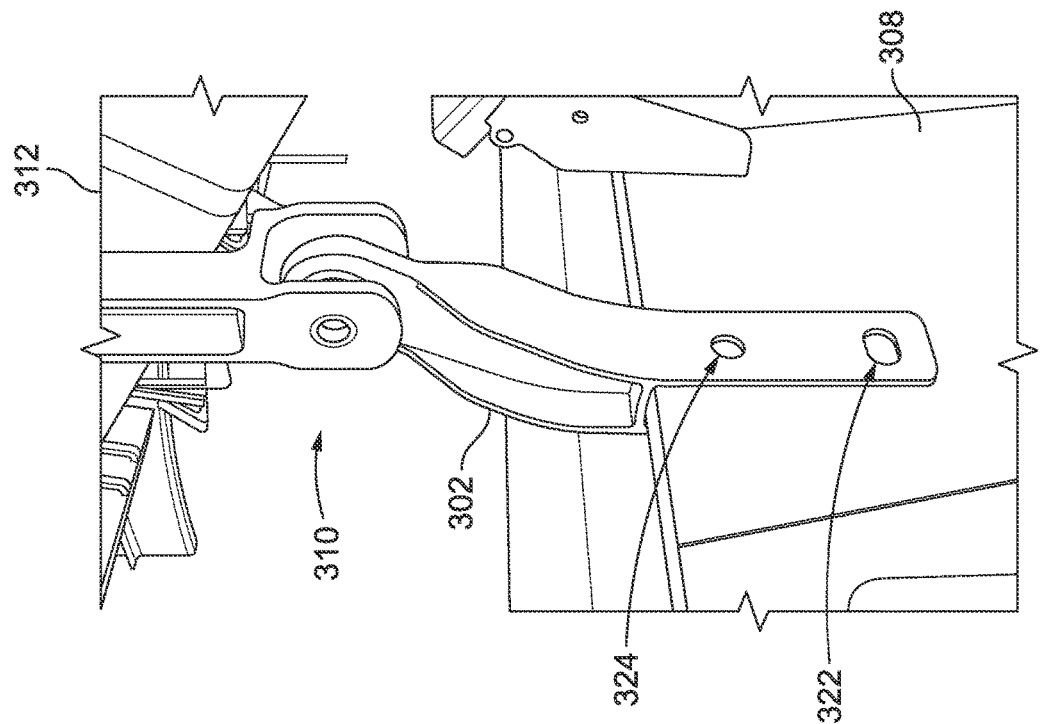
FIG. 13 is a diagrammatic representation of a perspective view of the self-aligning attachment of FIG. 12 attached to an example CIP and an example airframe, in accordance with an exemplary embodiment.
Figure 12:
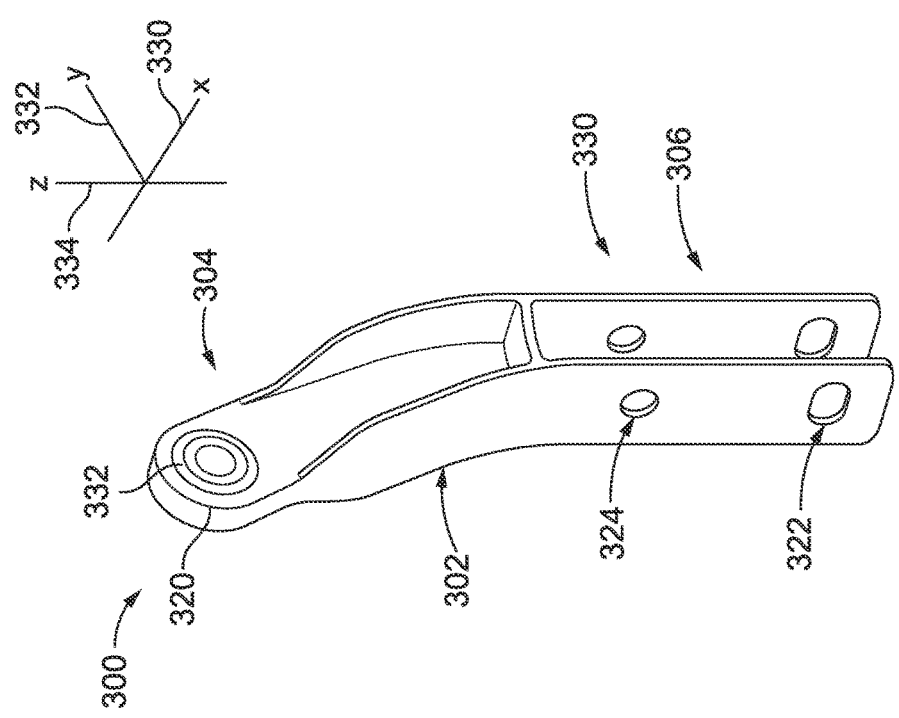
FIG. 12 is a diagrammatic representation of a perspective view of a self-aligning attachment, in accordance with an exemplary embodiment.
Figure 14:
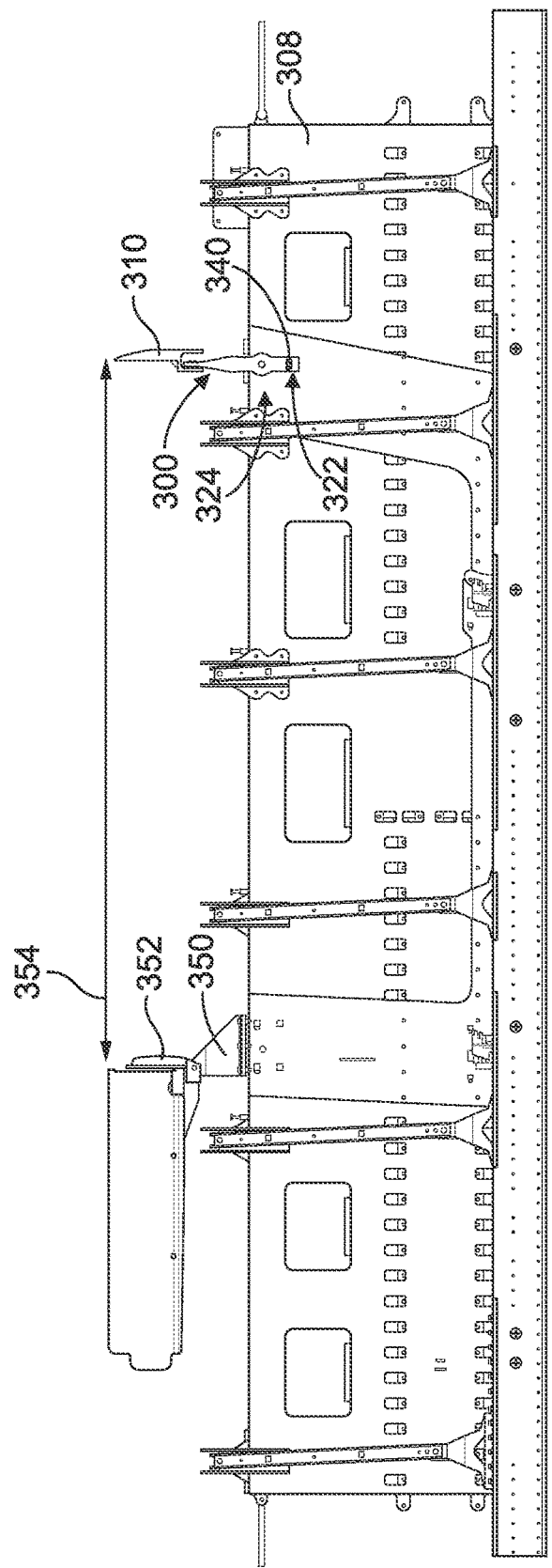
FIG. 14 is a diagrammatic representation of a perspective view of support system having the self-aligning structural attachment of FIG. 12 and a second CIP structural attachment, in accordance with an exemplary embodiment.
Figure 17:
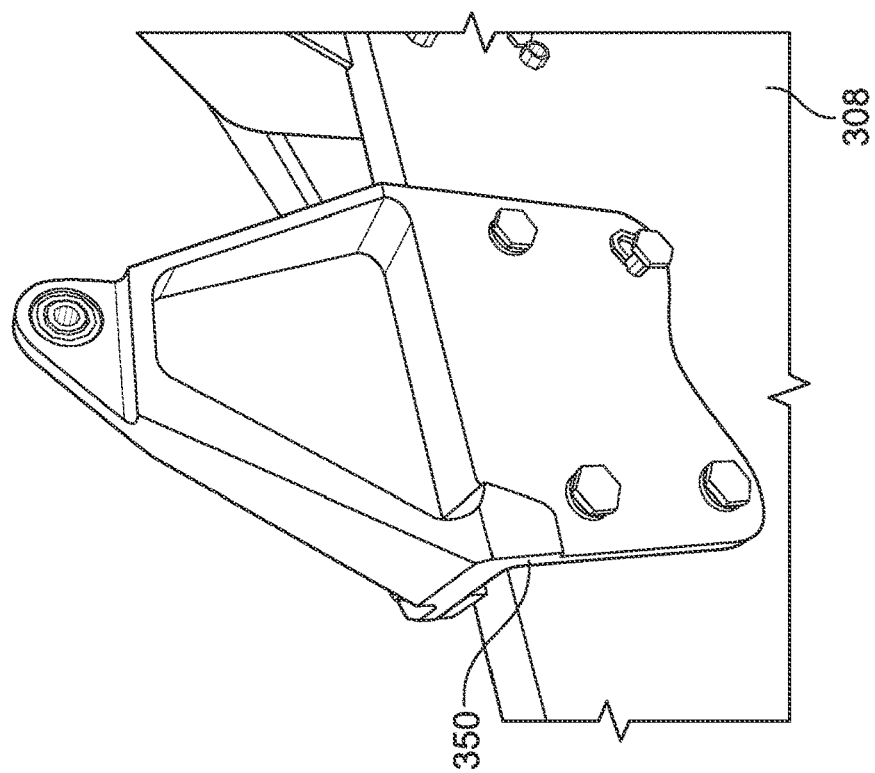
FIG. 17 is a diagrammatic representation of a perspective view of the second structural attachment of FIG. 14, in accordance with an exemplary embodiment.

An example self-aligning structural attachment described in greater detail with respect to FIGS. 12-18. FIG. 12 depicts an example self-aligning structural attachment 300. This self-aligning structural attachment corresponds to the attachment 18 shown in FIG. 1. In an example embodiment, in addition to the self-aligning structural attachment 300, a second attachment may also attach CIP 308 to the airframe 312. For instance, as shown in FIGS. 14 and 17, second attachment 350 attaches CIP 308 to airframe 312. Second attachment 350 corresponds to second attachment 20 shown in FIG. 1.

Self-aligning structural attachment 300 provides beneficial functionality during the aircraft assembly process as well as during flight of the aircraft. With respect to the assembly process, the self-aligning attachment 300 may help to account for build variations in the airframe of the aircraft. In an example embodiment, an airframe of a given aircraft model will typically have clevises for attaching secondary structure separated by a standard distance. For instance, as shown in FIG. 14, a location of a first clevis 310 and a location of a second clevis 352 are separated by a distance 354. However, typically, there is a build tolerance in distance from frame to frame of the aircraft frame. Therefore, the distances between respective clevises may vary from frame to frame on the aircraft. Self-aligning structural attachment 300 accommodates for build tolerances typically encountered in aircraft design.

Since the CIP 308 attaches directly to the structural frame of the airframe 312 via these clevises, self-aligning structural attachment 300 is configured to absorb the build tolerance from frame to frame. The self-aligning structural attachment 300 combines adjustability and adaptability functions into a single component, and self-aligning structural attachment 300 is able to reduce or eliminate manual adjustment (e.g., using tie rods) during the installation process of attaching the CIP to the airframe. In order to achieve this adjustability and adaptability, the self-aligning structural attachment includes a pivoting fitting component that allows for various degrees of freedom for the attachment. This pivoting component, combined with a slot, allows for limited float in the lug that attaches to the airframe.

Figures 15, 16:
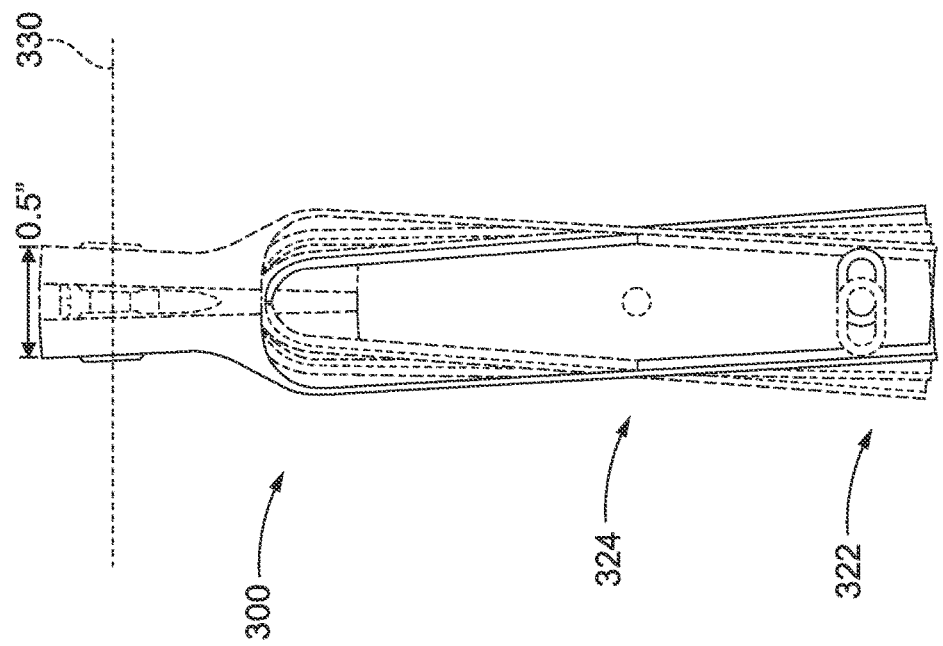
FIG. 15 is a diagrammatic representation of a front view of a self-aligning attachment positioned in various example orientations, in accordance with an exemplary embodiment.
FIG. 16 is a diagrammatic representation of a cross-sectional view of a self-aligning attachment, in accordance with an exemplary embodiment.

With reference to FIGS. 12, 13, and 15, self-aligning structural attachment 300 includes a main body 302 having a proximal end 304 and a distal end 306. As shown in FIG. 13, the main body 302 is configured to attach to a CIP 308 of a support system. Further, the main body 302 is configured to attach to a clevis 310 on an airframe 312 of an aircraft. The self-aligning structural attachment 300 includes a first attachment fitting 320, a second attachment fitting 322, and a pivoting hinge 324. The first attachment fitting 320 is disposed on proximal end 304, and this first attachment fitting 320 is a slide-and-swivel attachment fitting. The second attachment fitting 322 is disposed on the distal end 306, and this second attachment fitting 322 is a slide attachment fitting. Further, the pivoting hinge 324 is disposed between the first attachment fitting 320 and the second attachment fitting 322. The main body 302 may form a main-body clevis 330, and this clevis is configured to receive the CIP 308. The main-body clevis 330 includes both the pivoting hinge 324 and the second attachment fitting 322.

In an example embodiment, the first attachment fitting 320 comprises a spherical bearing 332. The first attachment fitting 320 provides four degrees of freedom. For instance, with reference to FIG. 12, the four degrees of freedom are rotation about an X axis 330, rotation about a Y axis 332, rotation about a Z axis 334, and translation along the X axis 330. Further, the first attachment fitting 320 prevents translation along the Y axis 332 and the Z axis 334. In an example embodiment, motion along the X axis 330 corresponds to fwd/aft motion, motion along the Y axis 332 corresponds to inboard/outboard motion, and motion along the Z axis 334 corresponds to up/down motion.

The pivoting hinge 324 provides one degree of freedom, which is rotation about the pivoting hinge 324. In an example embodiment, the pivoting hinge 324 includes a bushing or spacer, and this bushing or spacer may prevent clamp-up and permit limited hinge action. The second attachment fitting 322 provides two degrees of freedom. These two degrees of freedom are rotation about the pivoting hinge 324 and translation along the X axis 330. Movement of a fastener 340 (see FIG. 14) within the second attachment fitting 322 allows for a limited amount of translation of the distal end 306 along the X axis 330 (see FIG. 15). This allows for a limited amount of rotation of the self-aligning structural attachment 300 about the pivoting hinge 324 and a limited amount of translation of the proximal end 304 along the X axis 330 (see FIG. 15).

As mentioned above, this self-aligning structural attachment 300 accommodates for build variations. In an example embodiment, the self-aligning structural attachment 300 is configured to accommodate translation along the X axis 330 of about 0.5 inches. For example, as shown in FIG. 15, the self-aligning structural attachment 300 can translate about 0.5 inches about X-axis 330. However, in other examples, the self-aligning structural attachment 300 can translate more or less than about 0.5 inches. In another example, the self-aligning structural attachment 300 can translate about 0.4 inches about X-axis 330. In yet another example, the self-aligning structural attachment 300 can translate about 0.6 inches about X-axis 330. Other examples are possible, as well. The amount that the self-aligning structural attachment 300 can translate may be dependent on the build variation of the components to which the self-aligning structural attachment 300 is intended to attach.

Further, in addition to providing beneficial functionality during the assembly process, self-aligning structural attachment 300 may also provide beneficial functionality during flight of the aircraft. Pivoting of the self-aligning structural attachment 300 helps the support system 10 to adapt and adjust to body deflections that may occur during flight of the aircraft.

Figure 18:
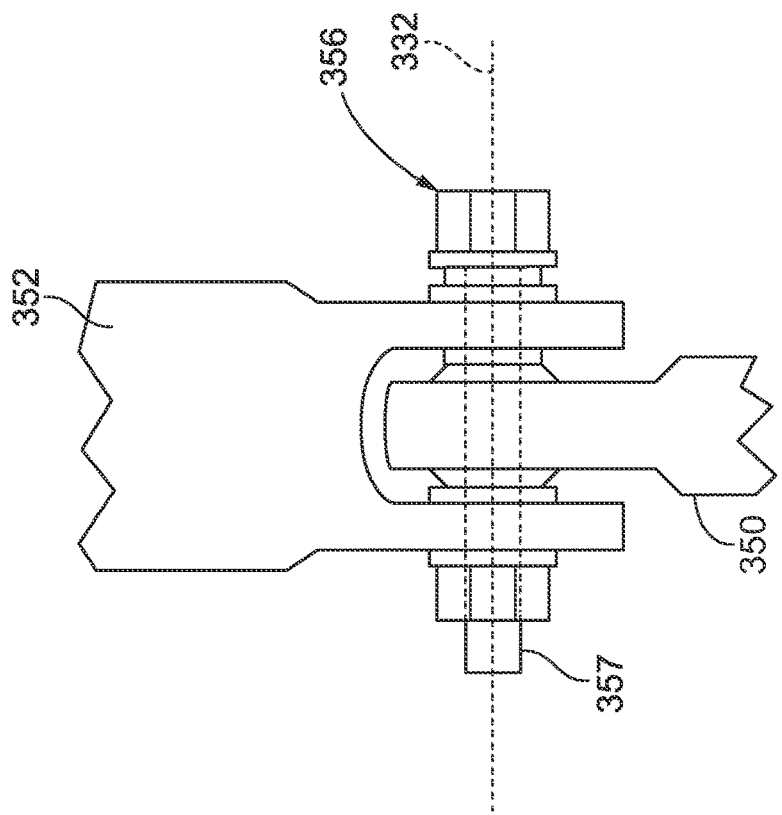
FIG. 18 is a diagrammatic representation of a cross-sectional view of a portion of the structural attachment of FIG. 17 clamped to a clevis, in accordance with an exemplary embodiment.

As mentioned above, the CIP 308 is also attached to the airframe 312 by second attachment 350. FIG. 17 shows a diagrammatic representation of a perspective view of the second attachment 350. In an example embodiment, this second attachment 350 is configured to allow for rotation but to prevent translation along X axis 330, Y axis 332, and Z axis 334 (see FIG. 12). Second attachment 350 may be configured to carry more load than self-aligning structural attachment 300. For instance, the method of attaching second attachment 350 to the airframe may be different than the method of attaching self-aligning structural attachment 300 to the airframe. In an example embodiment, the second attachment 350 is clamped to the clevis 352. With reference to FIG. 18, clamp 356 clamps second attachment 350 to clevis 352. The clamp may include a pin 357 that is oriented about Y axis 332. Clamps (like clamp 356) may provide better load-bearing capability than other types of attachments. For instance, other structural attachments, such as a pin without a clamp, may be less optimal for load-bearing capability. In an example embodiment, self-aligning structural attachment 300 is not clamped to the airframe. For instance, in an example, the self-aligning attachment 300 is connected to clevis 310 with a pin 325. For example, as shown in FIG. 16, a pin 325 oriented along X axis 330 can connect attachment 300 to clevis 310. Since a pin (like pin 325 of FIG. 16) typically provides less load-bearing capability than a clamp (like clamp 356 of FIG. 18), by having the CIP 308 clamped to clevis 352 (FIG. 14) but pinned to clevis 310 (FIG. 14), the second structural attachment 350 may carry more load than the self-aligning structural attachment 300.

With reference to FIGS. 12-16, the design of the self-aligning structural attachment 300 allows the CIP 308 to deflect forward under load without bearing against the vertical support clevis 310. The clevis 352 (see FIGS. 14, 17 and 18) may take all the forward load. In an example embodiment, the self-aligning structural attachment 300 isolates the clevis 310 from a longitudinal load up to a 9G-force stress level. The deflection under load is less than the available range of motion allowed by the self-aligning structural attachment.

In an example embodiment, the self-aligning structural attachment 300 is machined from aluminum. However, in other embodiments, the self-aligning structural attachment 300 may be formed in other ways and/or from different material.

5. Example Methods

FIGS. 19-22 illustrate example methods that can be carried out in accordance with the present disclosure.

Figure 19:
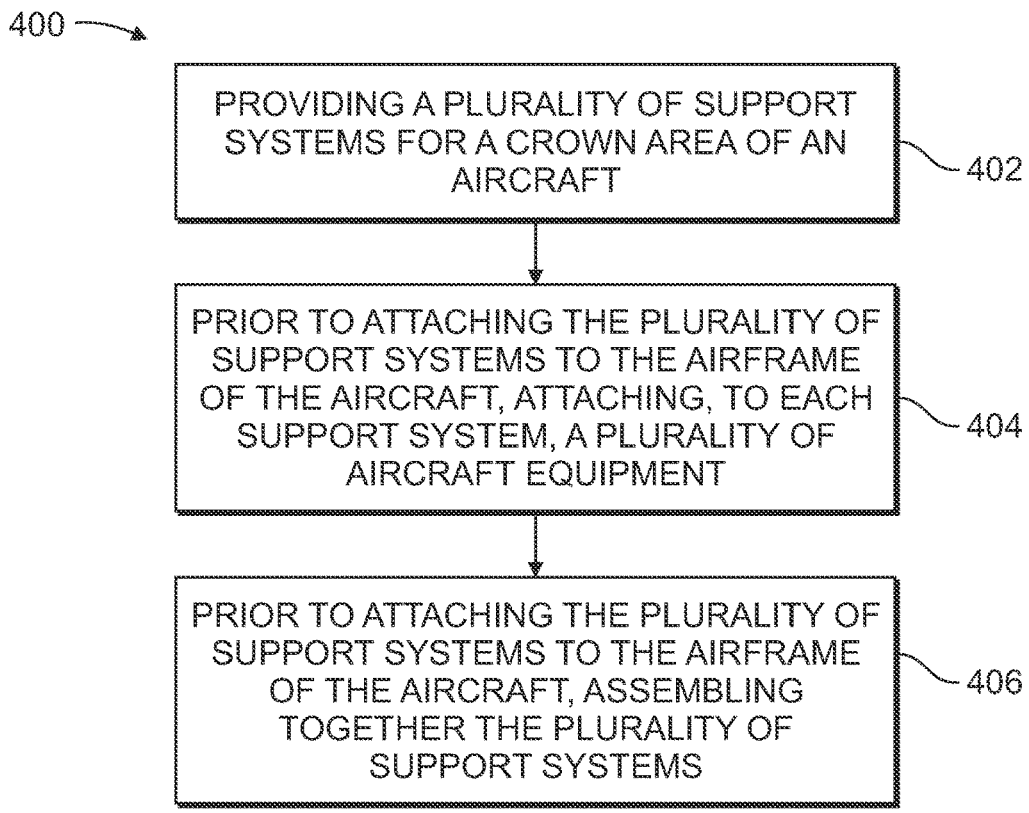
FIG. 19 is a flow chart depicting functions that can be carried out in accordance with an example method.

FIG. 19 is an illustration of a flow diagram of an embodiment of a method 400 of the disclosure for attaching a support system 10 to an airframe 50 of an aircraft. The method 400 comprises step 402 of providing a plurality of support systems 10 for a crown area of an aircraft. Each support system comprises (a) a crown integration panel (CIP) 12 comprising a honeycomb panel 14 and sheet metal 16, wherein the CIP 12 is configured to provide a mounting surface for a plurality of aircraft equipment and to provide a ground for at least one of the aircraft equipment of the plurality of aircraft equipment. Each support system further includes a first attachment 18 and a second attachment 20 attached to the CIP 12, wherein the first attachment 18 and the second attachment 20 are configured to attach to an airframe 50 of the aircraft and to provide vertical and lateral support for the CIP 12. Each support system 10 also includes one or more crown raceway supports (CRSs) 22a-f having a first end 24 and a second end 26, wherein the first end 24 of the CRS is attached to a first end 28 of the CIP 12, and wherein the second end 26 of the CRS is configured to attach to an outboard rail 30 of the aircraft.

The method further includes, at step 404, prior to attaching the plurality of support systems 10 to the airframe 50 of the aircraft, attaching, to each support system 10, the plurality of the aircraft equipment, such as supporting electrical equipment 52, first bundle 54 of wires, second bundle 56 of wires, ECS duct 58, ECS gasper 60, oxygen line 62, water line 64, power feeder 66, and leaky feeder 68. The method then includes, at step 406, prior to attaching the plurality of support systems to the airframe 50 of the aircraft, assembling together the plurality of support systems 10.

Figure 20:
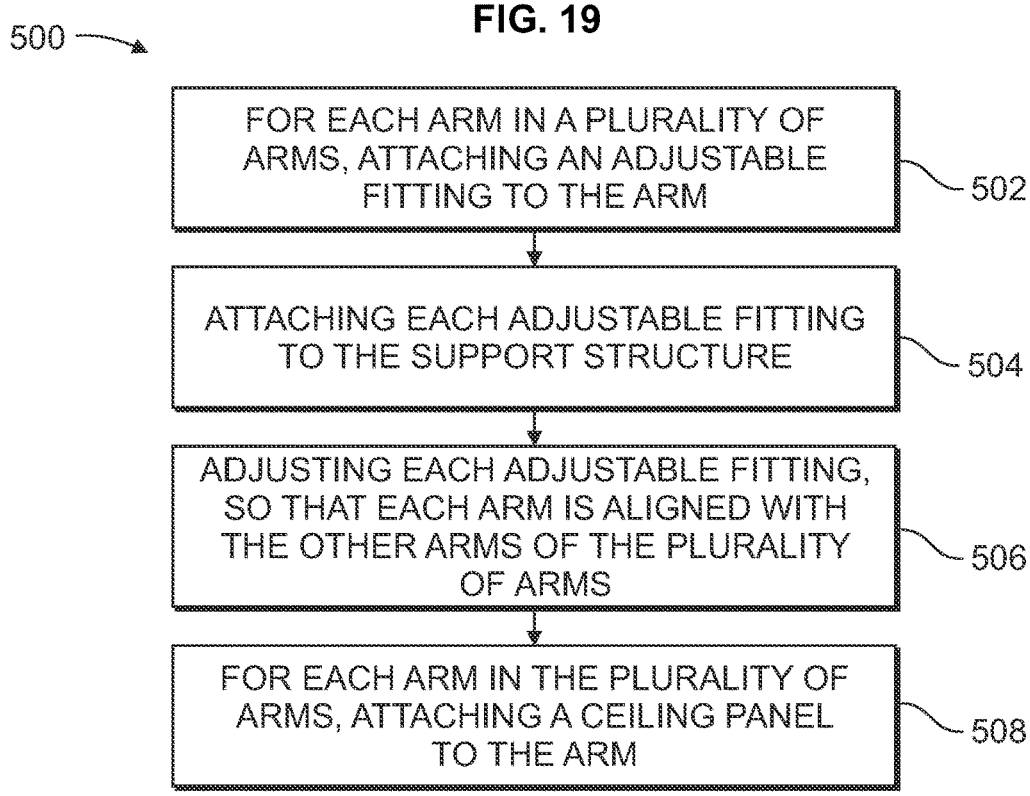
FIG. 20 is a flow chart depicting functions that can be carried out in accordance with another example method.

FIG. 20 is an illustration of a flow diagram of an embodiment of a method 500 of the disclosure for installing ceiling panels 230, 232 for an aircraft. The method 500 includes, at step 502, for each arm 202 in a plurality of arms, attaching an adjustable fitting 208 to the arm. The adjustable fitting comprises (i) a first sliding block 210 configured to attach to the arm 202, (ii) a second sliding block 212 configured to attach to a support structure such as CIP 213, and (iii) an adjustment screw 214, wherein adjustment of the adjustment screw forces the first and second sliding blocks 210, 212 to move relative to one another.

The method further includes, at step 504, attaching each adjustable fitting 208 to the support structure 213. The method then includes at step 506, adjusting each adjustable fitting 208, so that each arm 202 is aligned with (or positioned relative to) the other arms of the plurality of arms 202. The method also includes, at step 508, for each arm 202 in the plurality of arms, attaching a ceiling panel to the arm such that the ceiling panels are aligned (or properly positioned) relative to one another.

Figure 21:
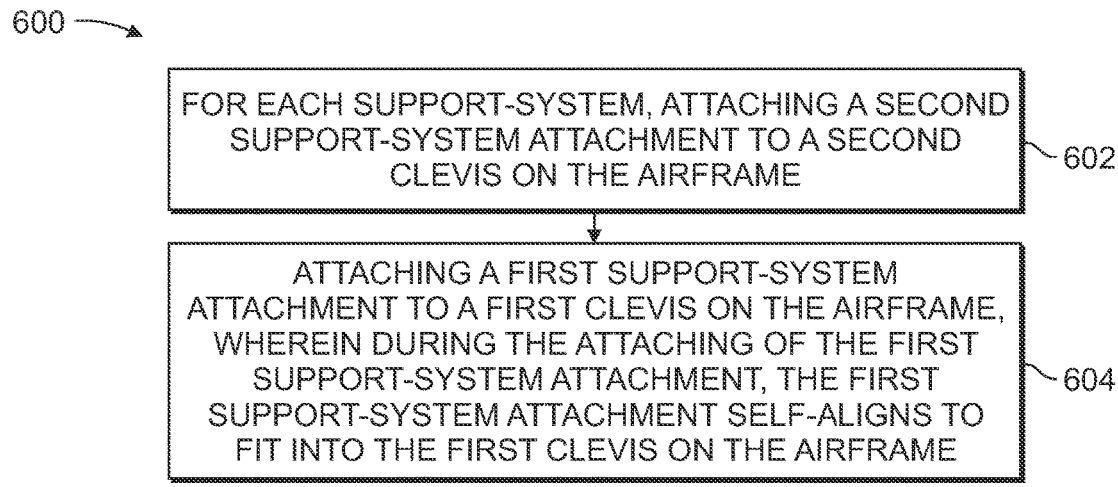
FIG. 21 is a flow chart depicting functions that can be carried out in accordance with yet another example method.

FIG. 21 is an illustration of a flow diagram of an embodiment of a method 600 of the disclosure for attaching a plurality of support systems 10 for a crown area of an aircraft to an airframe 50 of the aircraft. Each support system includes a first support-system attachment 18 and a second support-system attachment 20 for attaching the support system to an airframe 50 of an aircraft, wherein the first support-system attachment 18 comprises (i) a main body 302 having a proximal end 304 and a distal end 306, wherein the main body 302 is configured to attach to (a) a crown integration panel (CIP) 308 of the support system 10 and (b) a first clevis 310 on an airframe 50 of an aircraft, (ii) a first attachment fitting 320 disposed on the proximal end 304, wherein the first attachment fitting 320 is a slide-and-swivel attachment fitting, (iii) a second attachment fitting 322 disposed on the distal end 306, wherein the second attachment fitting 322 is a slide attachment fitting, and (iv) a pivoting hinge 324 disposed between the first attachment fitting 320 and the second attachment fitting 322.

The method 600 includes, at step 602, for each support system 10, attaching the second support-system attachment 20 to a second clevis 352 on the airframe 50. The method then includes, at step 604, attaching the first support-system attachment 18 to the first clevis 310 on the airframe 50, wherein during the attaching of the first support-system attachment 18, the first support-system attachment 18 self-aligns to fit into the first clevis 310 on the airframe 50.

Figure 22:
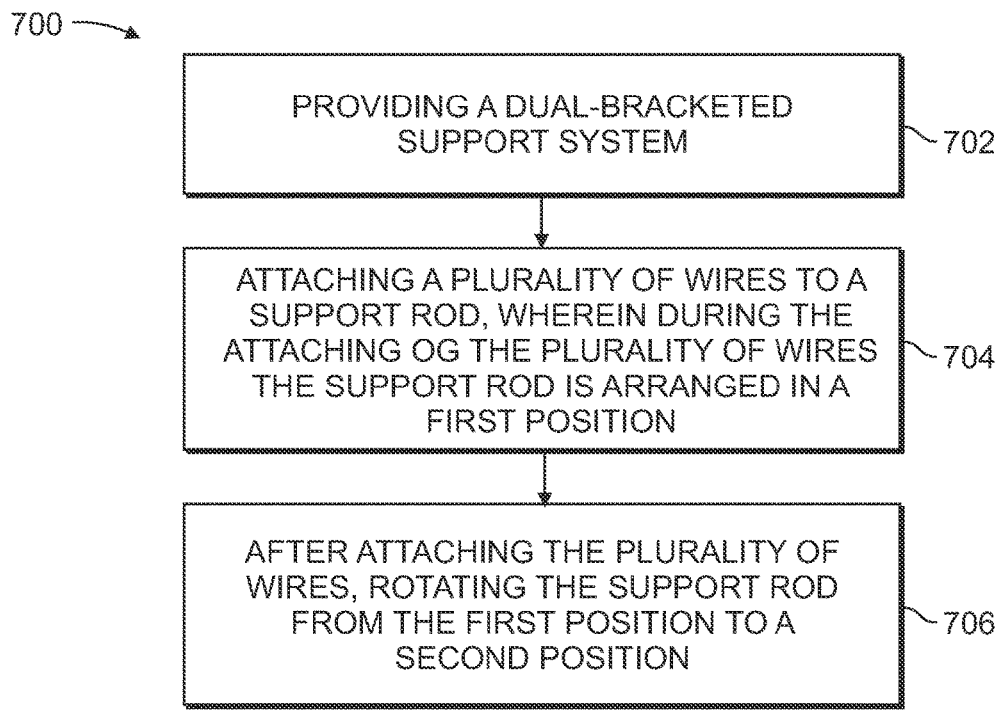
FIG. 22 is a flow chart depicting functions that can be carried out in accordance with yet another example method.

FIG. 22 is an illustration of a flow diagram of an embodiment of a method 700 of the disclosure for attaching wire bundles to a CRS such as CRS 22a. The method includes, at step 702, providing a dual-bracketed support system, such as dual-bracketed support system 100. The method further includes, at step 704, attaching a plurality of wires to the support rod 106, wherein during the attaching of the plurality of wires 54, 56, the support rod 106 is arranged in a first position. The method further includes, at step 706, after attaching the plurality of wires 54, 56, rotating the support rod 106 from the first position to a second position. In an example embodiment, rotating the support rod from the first position to a second position comprises rotating the support rod at least 100 degrees. For example, the second position may be the position shown in FIG. 7, and the first position may be a position that is at least about 100 degrees rotated from the second position.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

We claim:

1. A system for adjusting a height of a ceiling panel in an aircraft, the system comprising:
   an arm;
   at least one ceiling support latch, wherein each of the at least one ceiling support latches is attached to the arm;
   an adjustable fitting attached to a proximal end of the arm, wherein the adjustable fitting comprises (i) a first sliding block attached to the proximal end of the arm, (ii) a second sliding block attached to a support structure, and (iii) an adjustment screw, wherein adjustment of the adjustment screw forces the first and second sliding blocks to move relative to one another; and
   wherein a first ceiling support latch of the at least one ceiling support latch is configured to hold a first ceiling panel, and wherein a second ceiling support latch of the at least one ceiling support latch is spaced from the first ceiling support latch along the arm, and is configured to hold a second ceiling panel.

2. The system of claim 1, wherein the arm is directly connected to an outboard rail of the aircraft.

3. The system of claim 1, wherein the first and second sliding blocks moving relative to one another comprises (i) the second block remaining stationary with respect to the support structure and (ii) the first block moving relative to the second block and the support structure.

4. The system of claim 1, wherein the support structure is a crown integration panel (CIP) configured to provide a mounting surface for a plurality of additional aircraft equipment mounted to the CIP and to provide a ground for at least one of the aircraft equipment of the plurality of additional aircraft equipment.

5. The system of claim 4, wherein the arm provides a lateral load path for elements connected to the CIP.

6. The system of claim 1, wherein the adjustment screw is configured to be driven by a hex key or a screwdriver.

7. The system of claim 1, wherein the first block is directly attached to the proximal end of the arm by a pin.

8. The system of claim 1, wherein the second block is attached to the support structure by at least one screw.

9. The system of claim 1, further comprising at least one more arms, wherein each respective arm of the at least one more arm comprises a respective adjustable fitting attached to the respective arm, wherein the respective adjustable fitting comprises (i) a respective first sliding block attached to the respective arm, (ii) a respective second sliding block attached to the support structure or another support structure, and (iii) a respective adjustment screw.

10. A method for installing ceiling panels for an aircraft, the method comprising:
    providing a plurality of systems, wherein each system of the plurality of systems is a system as recited in claim 1;
    for each arm in the plurality of systems, attaching its respective adjustable fitting to the arm;
    attaching each adjustable fitting to the support structure;
    adjusting each adjustable fitting, so that each arm is aligned with the other arms of the plurality of systems; and
    for each arm in the plurality of systems, attaching the at least one ceiling panel to the arm.

11. The method of claim 10, further comprising attaching each arm to an outboard rail of the aircraft.

12. The method of claim 10, wherein attaching the at least one ceiling panel to the arm comprises:
    attaching the at least one ceiling support latch to the arm; and
    attaching the at least one ceiling panel to the at least one ceiling support latch.

13. The method of claim 10, wherein adjusting each adjustable fitting comprises adjusting the adjustment screw of each adjustable fitting with a screwdriver or a hex wrench.

14. The method of claim 10, wherein, after attaching the at least one ceiling panel to each arm, a height of each ceiling panel is aligned with respective heights of the other ceiling panels.

15. The method of claim 10, wherein adjusting each adjustable fitting, so that each arm is aligned with the other arms of the plurality of systems takes place before attaching the support structure to an airframe.

16. The method of claim 10, wherein each first block is attached to its respective arm by a pin.

17. The method of claim 10, wherein each second block is attached to the support structure by at least one screw.

18. The method of claim 10, wherein the support structure is a crown integration panel (CIP).

19. The system of claim 1, wherein the proximal end of the arm is fixed to the first sliding block such that the proximal end of the arm moves a same amount as the first sliding block.

20. The method of claim 10, wherein the support structure is a crown integration panel (CIP), and wherein each arm in the plurality of systems provides a lateral load path for elements connected to the CIP.

* * * * *